(12) United States Patent
Braden et al.

(10) Patent No.: US 9,958,166 B2
(45) Date of Patent: May 1, 2018

(54) HOUSEHOLD APPLIANCE HAVING A LATCH RETAINER FOR AN ALL GLASS INNER DOOR

(75) Inventors: Ben Braden, Lafollette, TN (US); Rose Marie Parker, Caryville, TN (US); Timothy Russell, Jacksboro, TN (US)

(73) Assignee: BSH Home Appliances Corporation, Irvine, CA (US)

(*) Notice: Subject to any disclaimer, the term of this patent is extended or adjusted under 35 U.S.C. 154(b) by 1343 days.

(21) Appl. No.: 13/484,743

(22) Filed: May 31, 2012

(65) Prior Publication Data

US 2013/0319395 A1 Dec. 5, 2013

(51) Int. Cl.
*F24C 15/04* (2006.01)
*F24C 15/02* (2006.01)
*A47J 37/01* (2006.01)
*A21B 3/02* (2006.01)
*F24B 1/192* (2006.01)

(52) U.S. Cl.
CPC ............. *F24C 15/022* (2013.01); *A21B 3/02* (2013.01); *A47J 37/01* (2013.01); *F24C 15/04* (2013.01); *F24B 1/192* (2013.01); *F24C 15/028* (2013.01)

(58) Field of Classification Search
CPC ...... F24C 15/022; F24C 15/04; F24C 15/028; A21B 3/02; A47J 37/01; F24B 1/192
USPC ........................................ 126/197, 200, 190
See application file for complete search history.

(56) References Cited

U.S. PATENT DOCUMENTS

| | | | | |
|---|---|---|---|---|
| 3,717,138 A | * | 2/1973 | Upp | F24C 15/04 126/200 |
| 3,877,460 A | * | 4/1975 | Lotz | F24C 15/04 126/198 |
| 4,103,671 A | * | 8/1978 | Smith | F24C 15/022 126/190 |
| 4,163,443 A | * | 8/1979 | Peterson | E05C 5/00 126/197 |
| 4,511,780 A | * | 4/1985 | Okamura | H05B 6/6417 126/197 |
| 4,817,585 A | * | 4/1989 | Craver | F24B 13/004 126/190 |
| 5,012,794 A | * | 5/1991 | Faurel | E05C 5/00 126/191 |

(Continued)

FOREIGN PATENT DOCUMENTS

DE 3537491 A1 * 4/1987 ............ F24C 15/024

Primary Examiner — Gregory Huson
Assistant Examiner — Daniel E Namay
(74) Attorney, Agent, or Firm — Michael E. Tschupp; Andre Pallapies; Brandon G. Braun

(57) ABSTRACT

A household cooking appliance including a housing having an oven chamber accessible through an opening. The opening has a seal surrounding a perimeter of the opening. A door covers the opening and is moveable about a hinge between an open position and a closed position. The door includes a door skin forming an outer surface of the door and a full glass inner panel forming an inner surface of the door. The full glass inner panel abuts the seal when the door is in a closed position. A latch retainer is coupled to the door skin and an oven lock is moveable between a lock position in which the oven lock engages the latch retainer and locks the door in the closed position during a self-cleaning process, and an unlock position in which the oven lock is disengaged from the latch retainer.

33 Claims, 29 Drawing Sheets

(56) References Cited

U.S. PATENT DOCUMENTS

| | | | | |
|---|---|---|---|---|
| 5,799,647 | A * | 9/1998 | Mills | F24C 15/04 126/200 |
| 6,397,836 | B1 * | 6/2002 | Pelletier | E05F 1/1276 126/194 |
| 7,157,667 | B2 * | 1/2007 | Gramlich | F24C 15/04 126/190 |
| 7,708,007 | B2 * | 5/2010 | Kim | F24C 15/04 110/175 R |
| 9,671,114 | B2 * | 6/2017 | Braden | F24C 15/04 |
| 2004/0159317 | A1 * | 8/2004 | Walther | F24C 15/006 126/198 |
| 2005/0076900 | A1 * | 4/2005 | Walther | F24C 15/006 126/198 |
| 2007/0125760 | A1 * | 6/2007 | Kim | F24C 15/006 219/391 |
| 2007/0251520 | A1 * | 11/2007 | Bang | F24C 15/022 126/200 |
| 2009/0194090 | A1 * | 8/2009 | Kim | F24C 15/006 126/198 |
| 2009/0255524 | A1 * | 10/2009 | Venezia | F24C 15/024 126/198 |
| 2010/0192935 | A1 * | 8/2010 | Capacci | F24C 15/04 126/190 |
| 2011/0214661 | A1 * | 9/2011 | Hyun | F24C 15/006 126/21 A |
| 2013/0318880 | A1 * | 12/2013 | Edwards | F24C 15/04 49/399 |
| 2013/0319393 | A1 * | 12/2013 | Harward | F24C 15/14 126/190 |
| 2013/0319395 | A1 * | 12/2013 | Braden | F24C 15/022 126/197 |
| 2013/0319396 | A1 * | 12/2013 | DeLozier | F24C 15/04 126/200 |
| 2013/0319397 | A1 * | 12/2013 | Braden | F24C 15/04 126/200 |
| 2013/0319398 | A1 * | 12/2013 | Braden | F24C 15/04 126/200 |
| 2015/0192304 | A1 * | 7/2015 | Turner | F24C 15/022 126/197 |
| 2015/0211745 | A1 * | 7/2015 | Stone | E05D 7/10 126/198 |
| 2016/0061457 | A1 * | 3/2016 | Armstrong | F24C 15/022 126/197 |

* cited by examiner

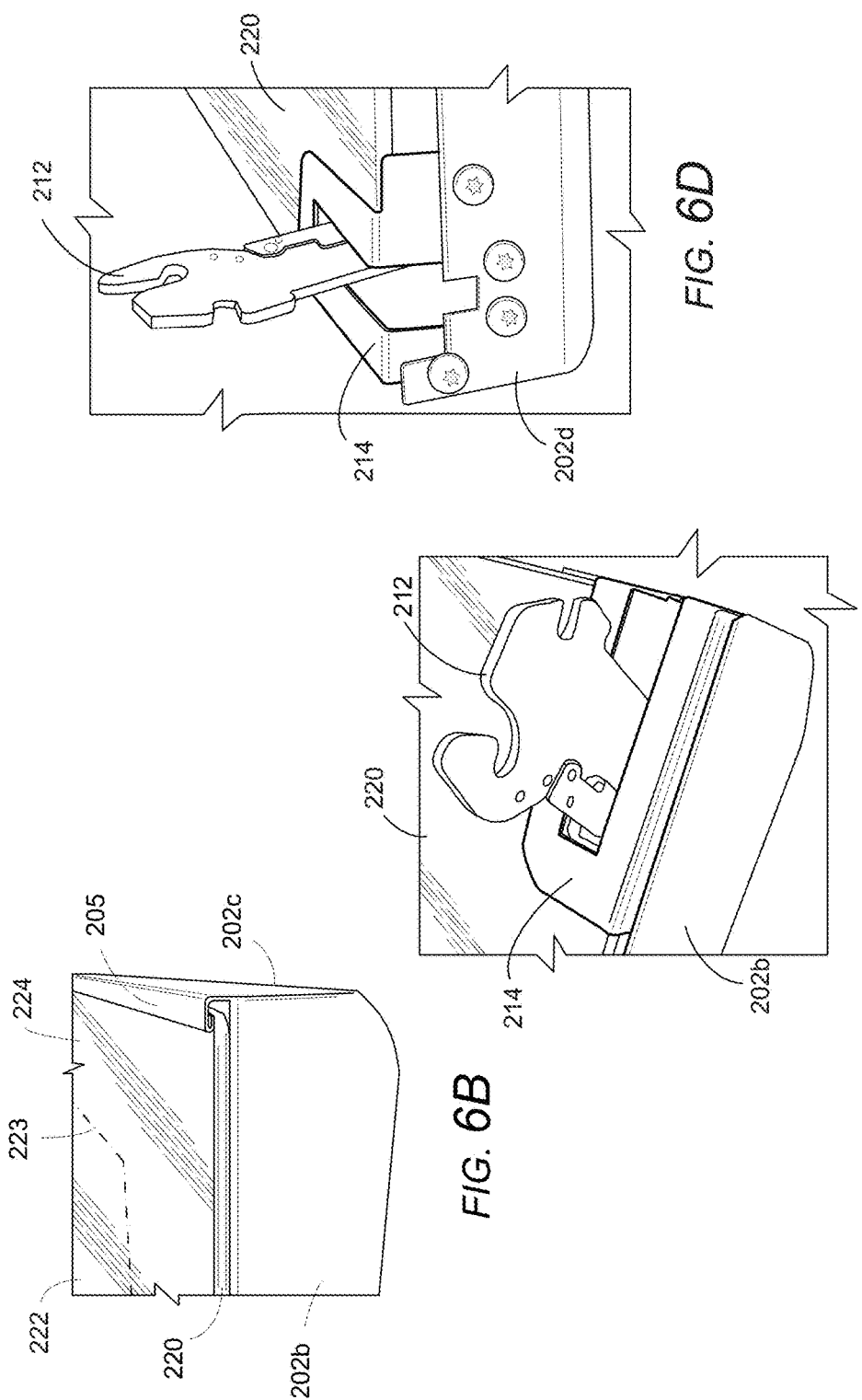

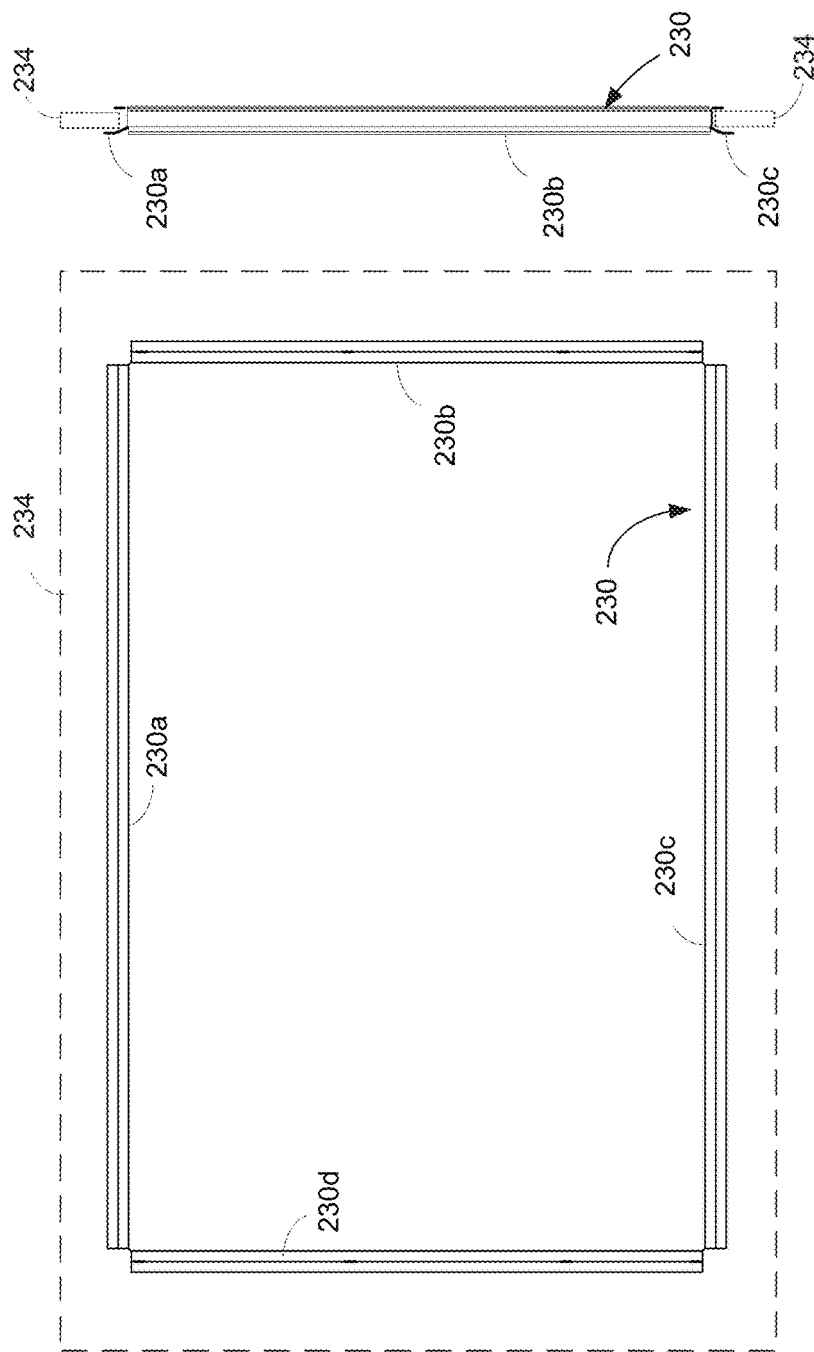

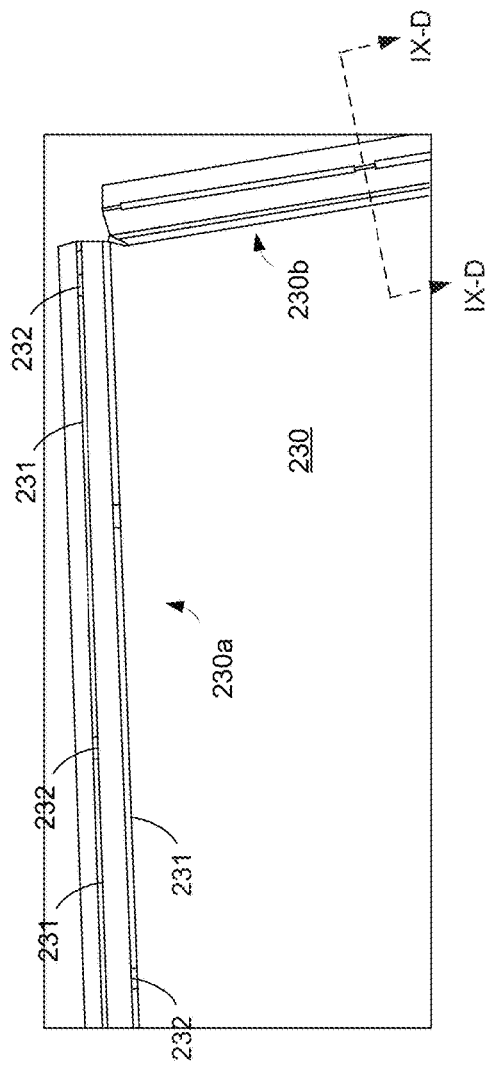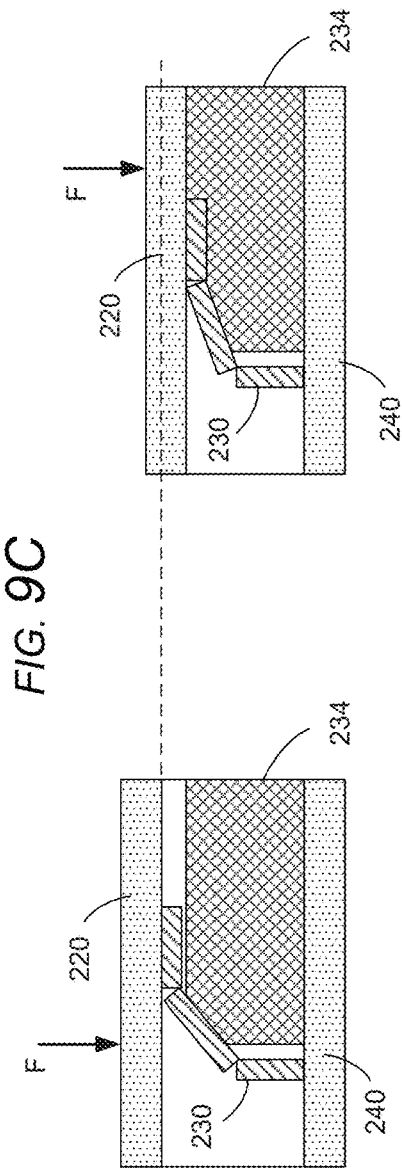

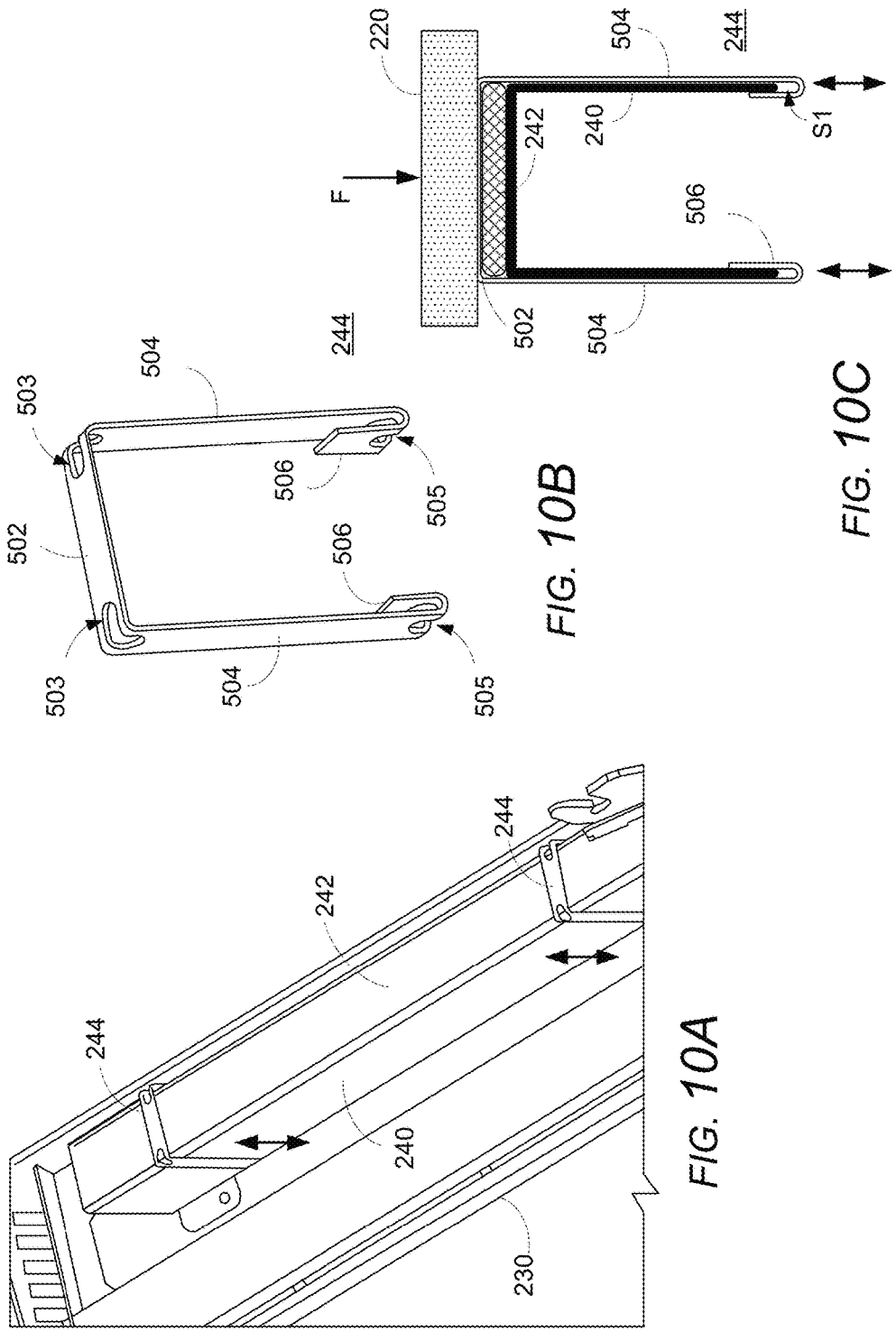

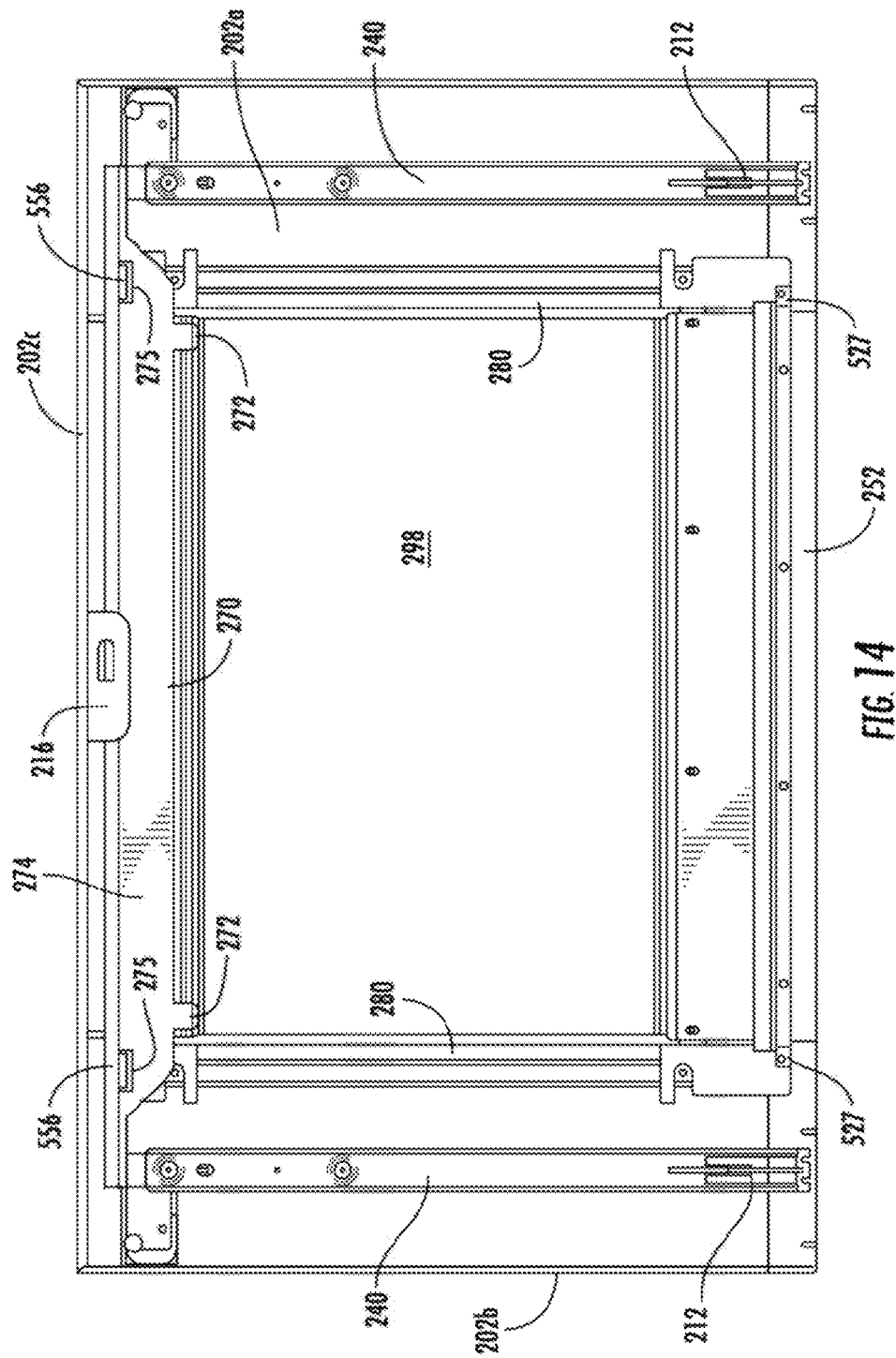

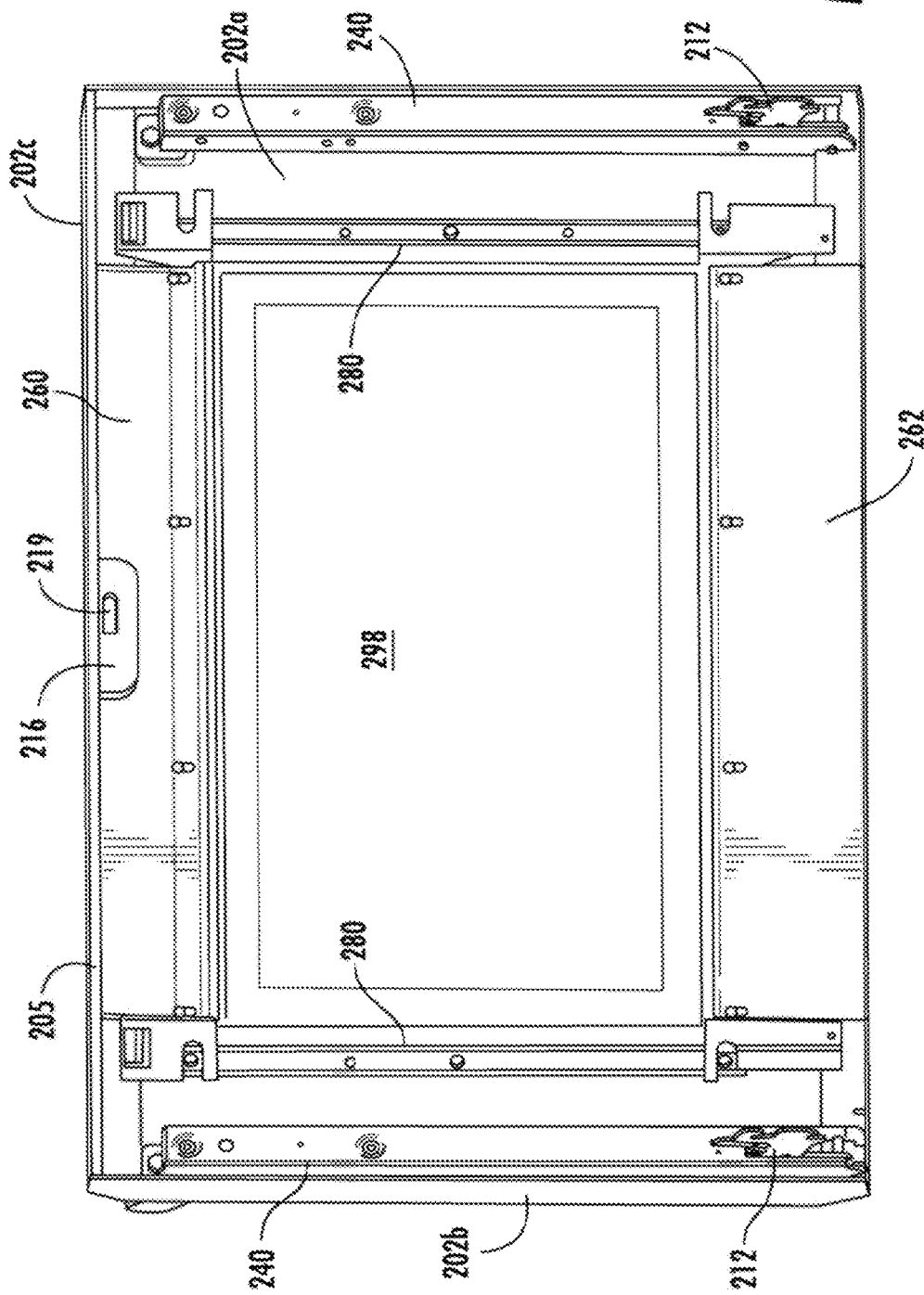

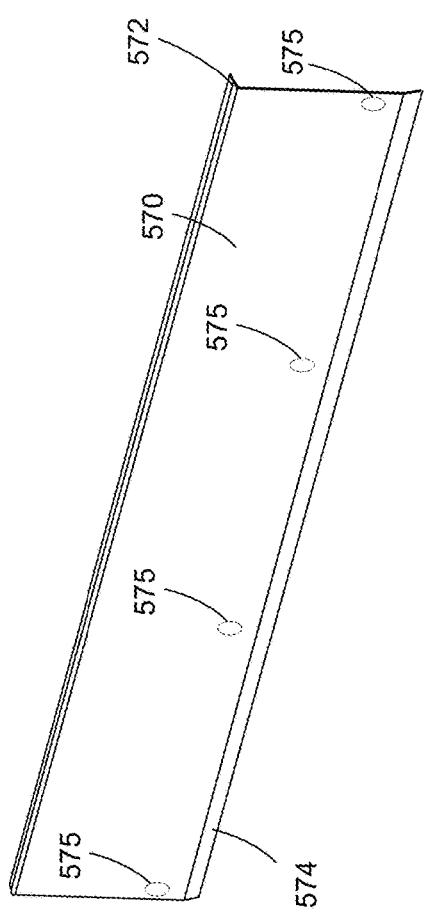
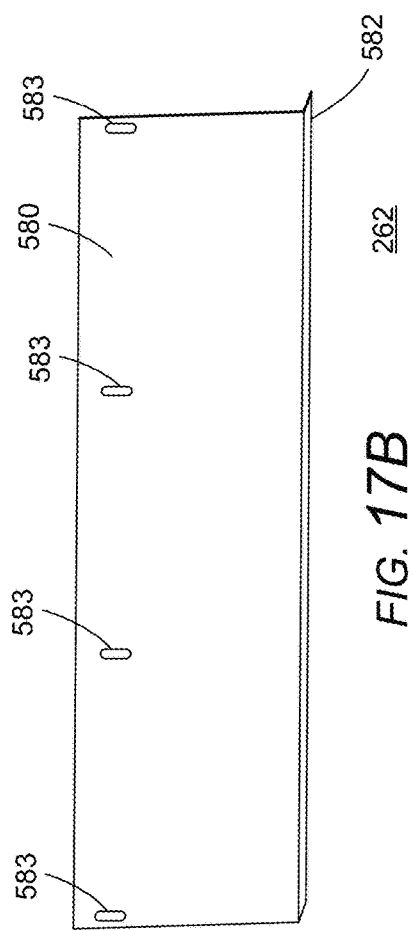
FIG. 17A
FIG. 17B

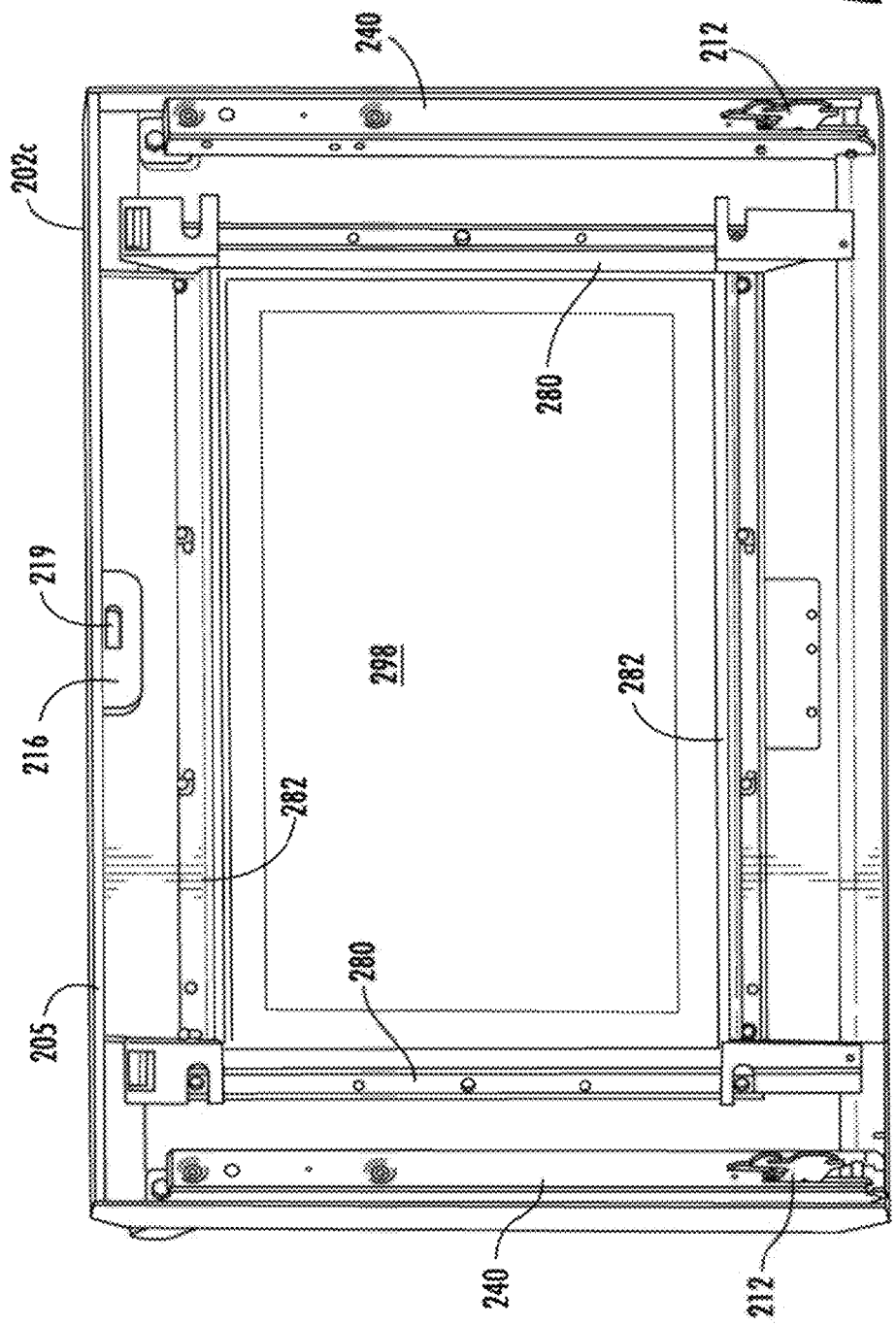

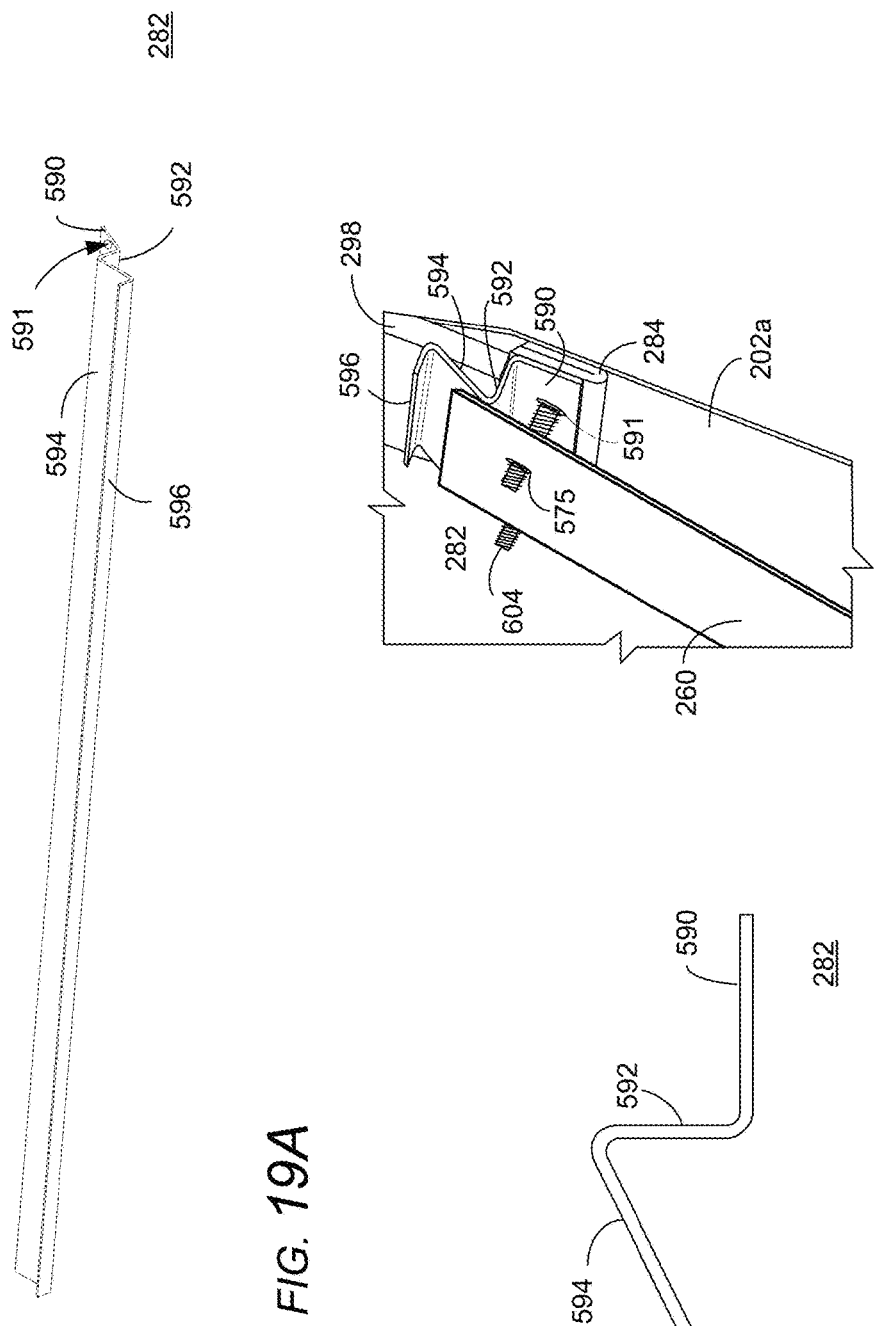

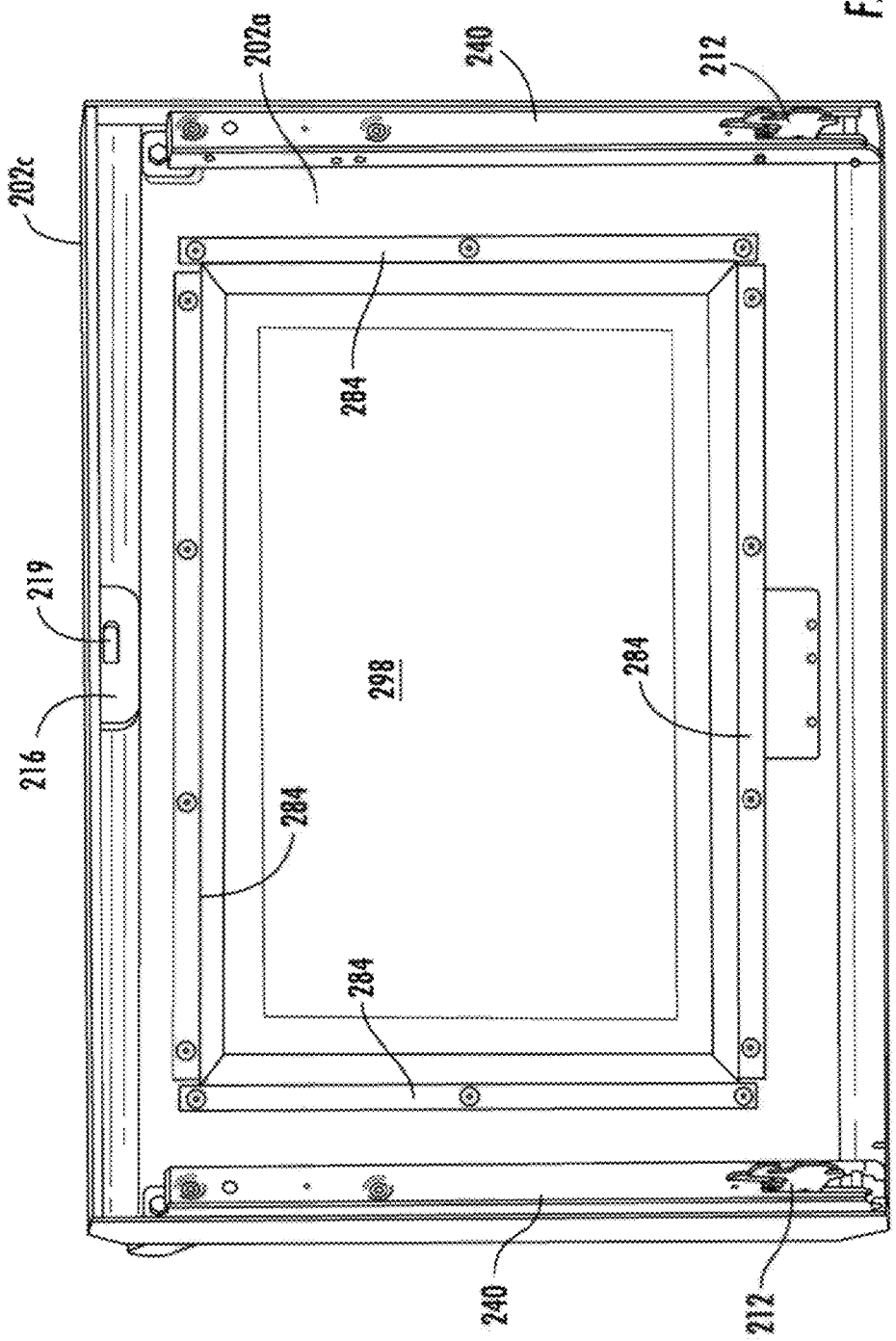

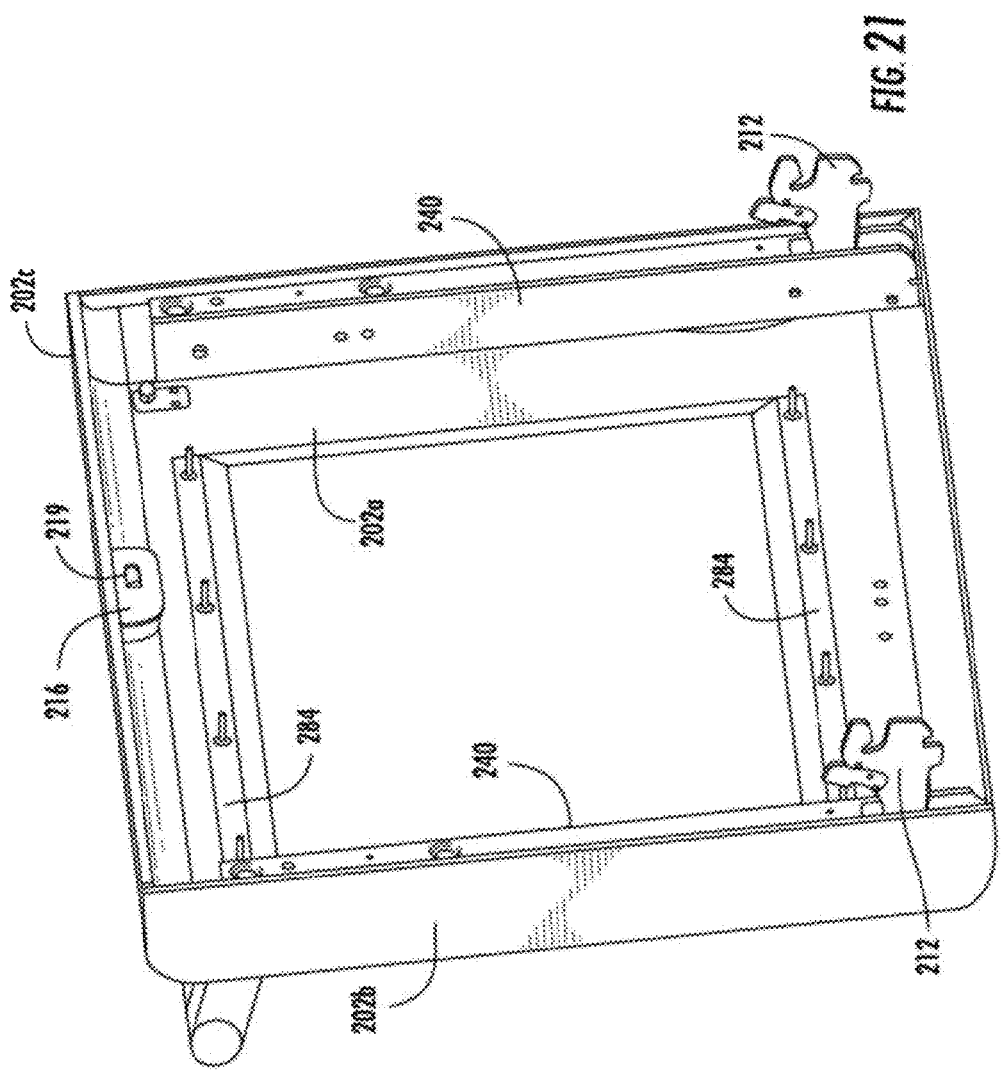

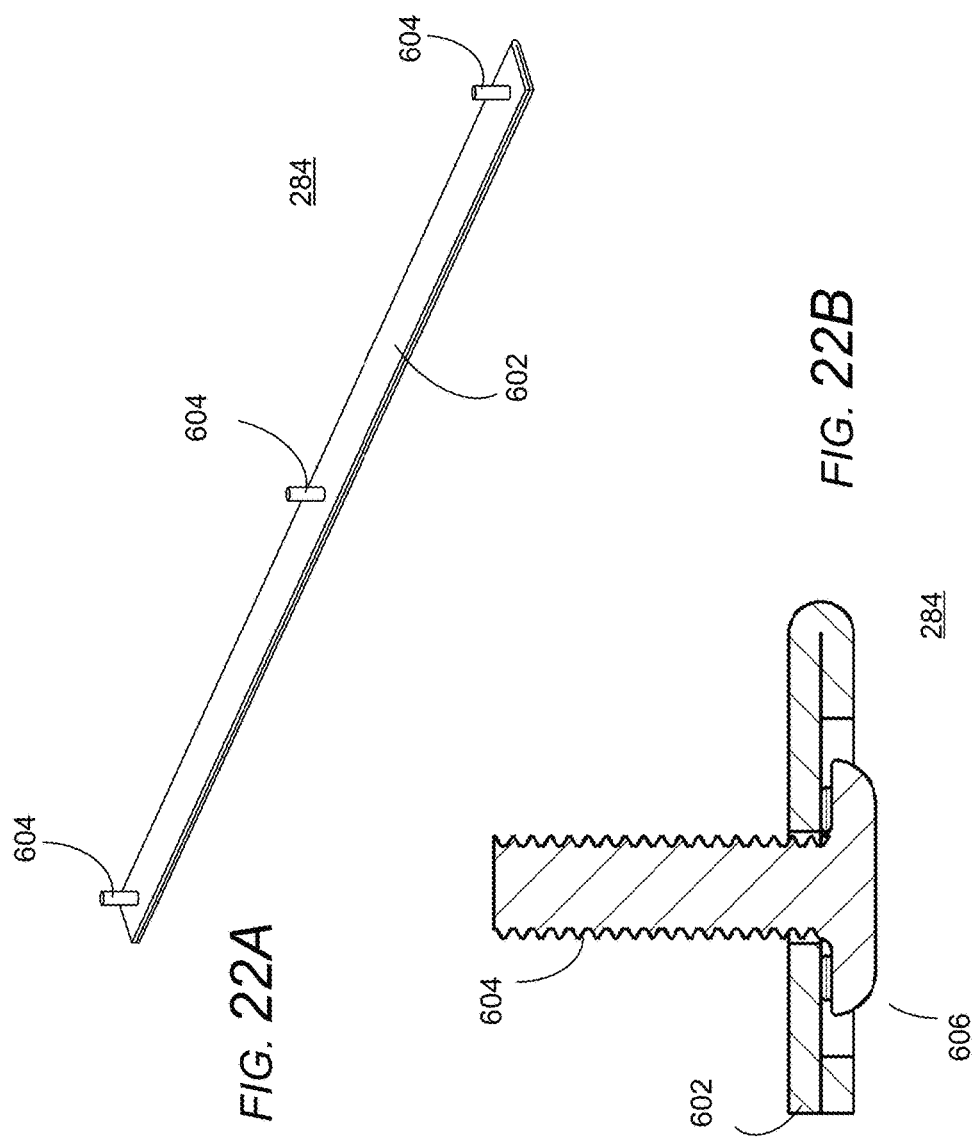

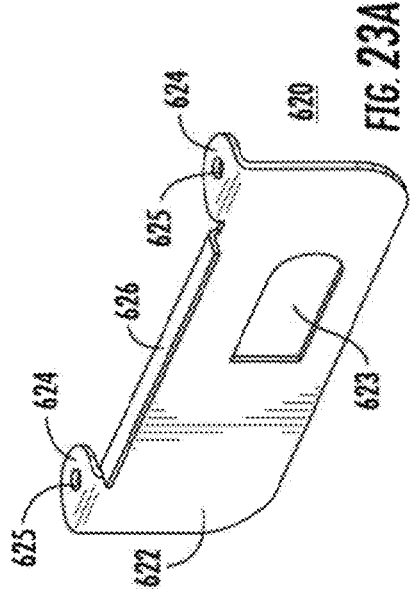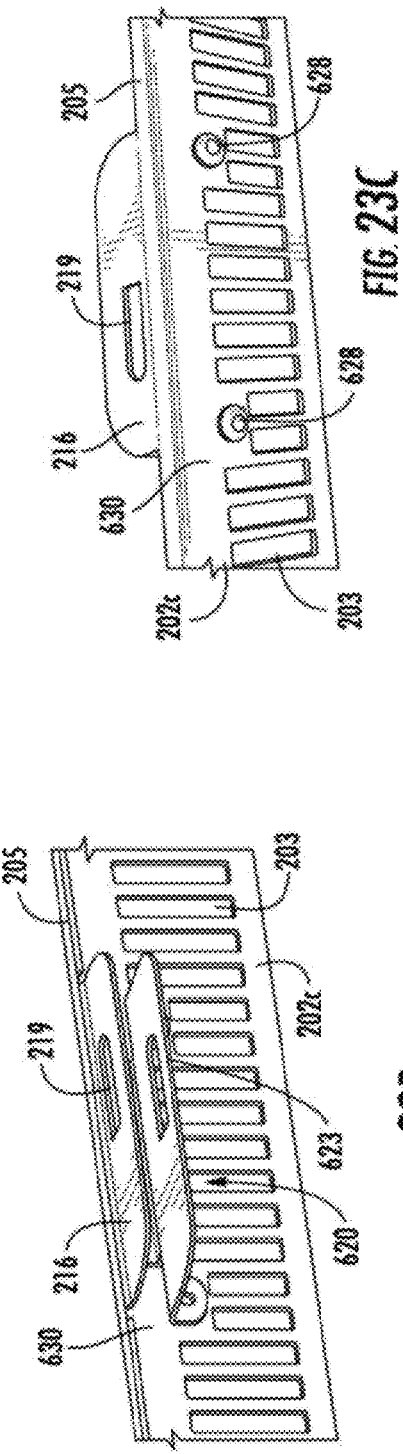

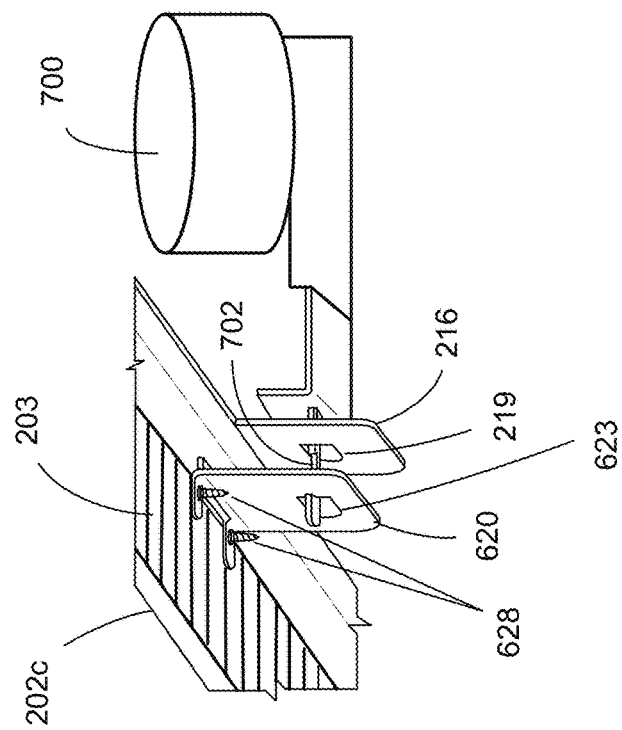
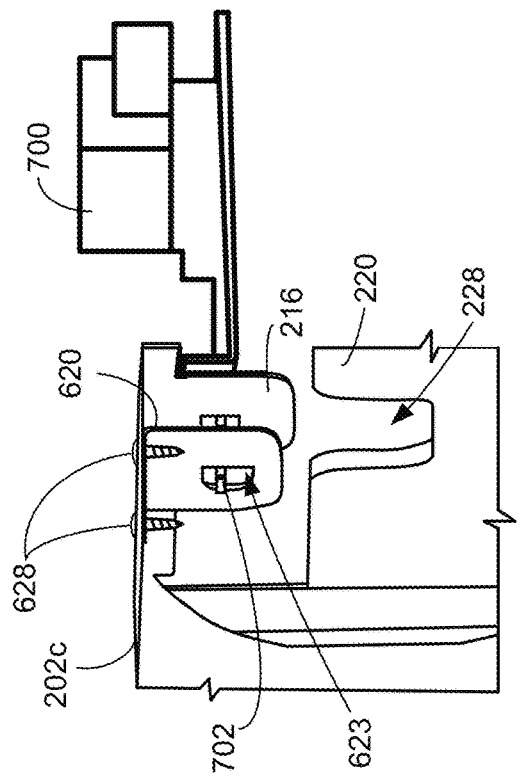
FIG. 24A
FIG. 24B

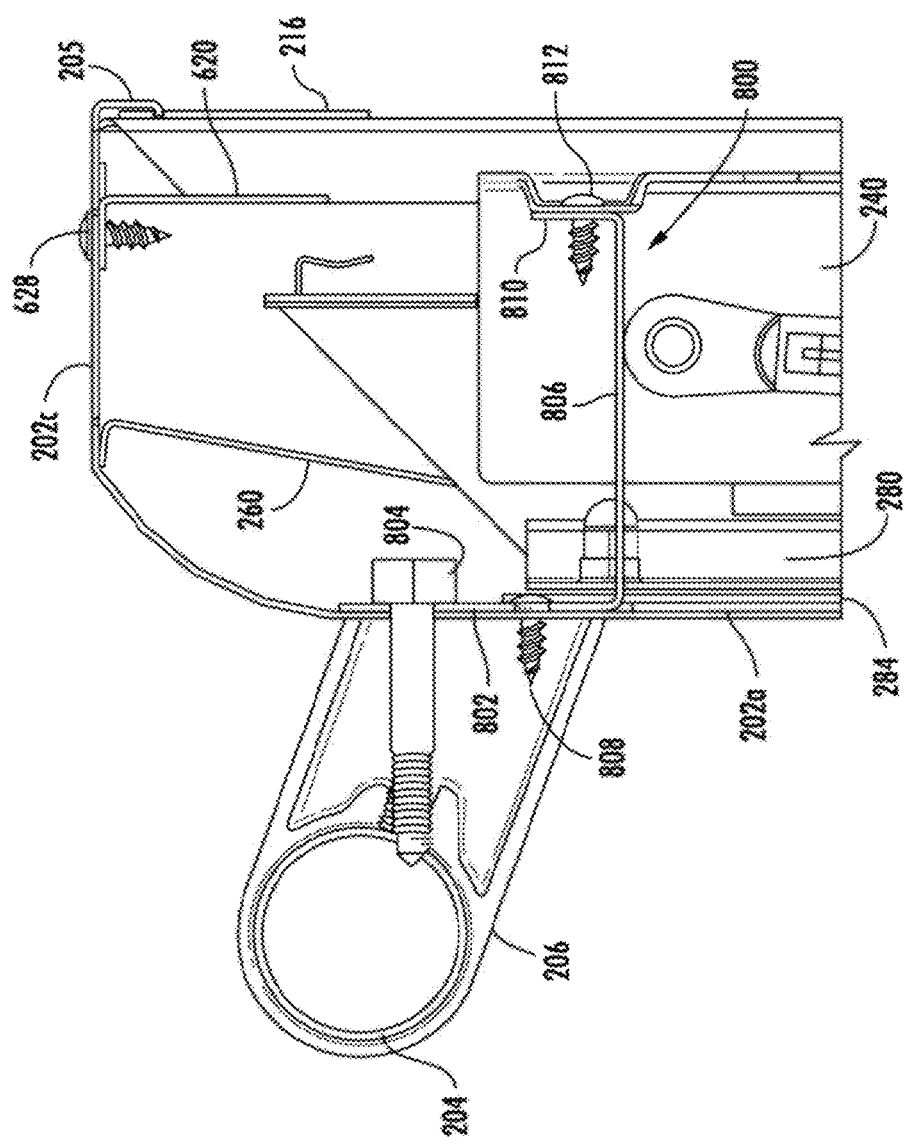

HOUSEHOLD APPLIANCE HAVING A LATCH RETAINER FOR AN ALL GLASS INNER DOOR

CROSS-REFERENCES TO RELATED APPLICATIONS

This application is related to Applicants' co-pending U.S. applications, entitled "HOUSEHOLD APPLIANCE HAVING A SELF CLEAN RANGE DOOR WITH A FULL GLASS INNER SURFACE", U.S. application Ser. No. 13/484,785; "HOUSEHOLD APPLIANCE HAVING A MOUNTING SYSTEM FOR A TRANSPARENT CERAMIC INNER DOOR PANEL", U.S. application Ser. No. 13/484,737; "HOUSEHOLD APPLIANCE HAVING A MOUNTING SYSTEM FOR A MIDDLE DOOR GLASS", U.S. application Ser. No. 13/484,735; "HOUSEHOLD APPLIANCE HAVING A MOUNTING SYSTEM FOR DOOR SKIN OUTER GLASS", U.S. application Ser. No. 13/484,746, each of which is incorporated herein by reference in its entirety.

FIELD OF THE INVENTION

The present invention is directed to a self-cleaning household appliance having a door, and more particularly, to a household appliance having a latch retainer for an all glass inner door panel.

BACKGROUND OF THE INVENTION

Conventional self-cleaning ovens and ranges commonly may include an oven door with a traditional metal "plunger" on the inside surface of the door. The plunger may include a plurality of glass panels to permit viewing an interior of the over chamber. Ovens having self-cleaning features have become popular among consumers and commonly are offered by manufacturers on many oven models. In a self-cleaning process, the oven door commonly is closed and locked by a mechanical latch to prevent opening during the self-cleaning process and then the oven chamber is heated to a high temperature, such as 900-1000° F., to reduce food pieces or other contaminants in the oven chamber to ash. In this way, the oven "self-cleans" the oven chamber, for example, without a user needing to apply a cleaning solution or solvent to the surface and/or to scrub the surface.

SUMMARY OF THE INVENTION

The present invention is directed to a household cooking appliance including a housing having an oven chamber accessible through an opening, the opening having a seal surrounding a perimeter of the opening, a door covering the opening and moveable about a hinge between an open position and a closed position, the door including a door skin forming an outer surface of the door and a full glass inner panel forming an inner surface of the door, the full glass inner panel abutting the seal when the door is in a closed position, a latch retainer coupled to the door skin, and an oven lock moveable between a lock position in which the oven lock engages the latch retainer and locks the door in the closed position during a self-cleaning process, and an unlock position in which the oven lock is disengaged from the latch retainer.

In this way, the present invention can replicate an interaction of a conventional porcelain liner/plunger with an oven latch to lock the range door for a self-cleaning process without a conventional porcelain liner/plunger. The latch retainer according to the exemplary embodiments can be attached to the door skin to maintain the appropriate spacing and strength needed to lock/latch the oven door in a closed position for the oven self-cleaning cycle. The latch retainer can be attached to a door skin of the door easily and efficiently, for example, using a plurality of fasteners such as two screws. In this manner, the exemplary latch retainer can replicate the conventional arrangement of a cutout on a porcelain liner/plunger in an inexpensive way that is easily produced, and moreover, easily repaired or replaced.

As a result, the latch retainer can permit the oven door to be locked securely such that a self-cleaning oven can be provided with a door having an inner surface made of a non-structural material such as a full glass inner panel. By enabling the use of the full glass inner panel, the present invention can provide an oven door that is easy to wipe and clean, increases an amount of space in the cooking chamber, reduces a number of glass panels needed to ensure a suitable surface temperature of the door skin, and provides an aesthetically pleasing appearance for marketing purposes.

To provide a better understanding of the invention, a summary of the problems with the conventional designs recognized by the present invention along with the reasons for improving the arrangement of the conventional self-cleaning oven door and the corresponding advantages provided by the present invention will be explained in greater detail.

Some conventional appliances, without self-cleaning features, may include a door in which the inside surface comprises a solid sheet of glass instead of a traditional metal "plunger". The implementation of such glass inner surfaces primarily has been driven by marketing objectives and commonly for cosmetic purposes. Such glass inner surfaces also can provide practical advantages such as making wiping and cleaning of the inside surface of an oven door easier and simpler for a user. However, the known appliances have not provided an oven door with a solid sheet of glass for appliances with self-cleaning features for at least the following reasons.

Conventional doors with a traditional metal "plunger" may include an inner glass panel that is supported by the plunger and inset from the edges of the plunger such that the entire glass panel is disposed inside the opening of the oven chamber. During a self-cleaning process, the entire inner glass panel is subjected to heating to the self-cleaning temperature (e.g., such as 900-1000° F.). Thus, the entire inner glass is heated to the same temperature and little or no temperature differential exists between different areas of the glass.

An oven door having a solid sheet of glass extending from edge to edge (i.e., side-to-side and top-to-bottom) of the inner side of the door has a first, inner portion of glass covering the opening to the oven chamber and disposed within a perimeter of a gasket surrounding the opening of the oven chamber. However, in stark contrast to a conventional door with a metal plunger, the solid sheet of glass also has a second, outer or perimeter portion of glass that extends past the gasket surrounding the opening of the oven chamber and to the edge of the door. In a self-cleaning process, the inner portion of the full glass inner surface within the gasket of the oven chamber opening is subjected to heating along with the rest of the interior of the oven chamber up to the self-cleaning temperature (e.g., such as 900-1000° F.). At the same time, the outer portion of the full glass inner surface that extends past the gasket may remain at or near room temperature. As a result, an extreme temperature differential may exist between the heated inner portion and the room temperature outer portion of the full glass inner surface during a self-cleaning process. These extreme temperature differentials can be problematic for conventional inner glass panels, which commonly have a relatively high coefficient of thermal expansion and may fracture, break, or even explode into pieces when exposed to extreme temperature differentials.

For example, conventional inner glass panels commonly may be formed from glass, such as soda-lime glass, that is capable of withstanding a predetermined amount of force (e.g., impact force, for example, resulting from a user dropping a pot or pan on the door when the door is in an open position in order) that may be exerted on the inner glass in order to comply with industry and government standards. However, the commonly used glass materials ordinarily have a relatively high coefficient of thermal expansion. Therefore, if a full glass inner surface of a self-cleaning oven door is formed using the conventional inner glass panels, the inner glass panel may break, fracture, or even explode into pieces when subjected to the extreme temperature differentials associated with a self-cleaning process. Therefore, the conventional glass panels are not suitable for a full glass inner surface of an oven with a self-cleaning feature.

The present invention addresses these problems by forming the inner glass panel from a transparent ceramic material with a low coefficient of thermal expansion. For example, a ceramic material, which can withstand large temperature differentials across an entire surface without breaking, can be used for the inner glass. More particularly, the door can include a full glass inner panel formed by a transparent ceramic material commonly used, for example, for fireplace glass (e.g., Robax® or Resistan™, manufactured by SCHOTT North America, Inc.), which can withstand large temperature differentials across its surface without breaking. In this way, the present invention can provide a full glass inner panel that can withstand the inner portion of the full glass inner surface within the gasket of the oven chamber opening being subjected to heating to the self-cleaning temperature while the outer or perimeter portion of the full glass inner surface that extends past the gasket remains at or near room temperature.

An exemplary embodiment provides a self-clean household cooking appliance including a housing having an oven chamber accessible through an opening, the opening having a seal surrounding a perimeter of the opening; and a door covering the opening and moveable about a hinge between an open position and a closed position. The door includes a full glass inner panel that abuts the seal when the door is in a closed position. The full glass inner panel includes an inner surface having a first portion and a second portion. The first portion is adjacent to a first area within the perimeter of the seal surrounding the opening and directly exposed to heating of the oven chamber, and the second portion is adjacent to a second area outside of the perimeter of the seal and not being exposed to heating of the oven chamber. The full glass inner panel extends substantially from edge-to-edge of the door.

The exemplary embodiments can provide a self-cleaning oven door for a self-cleaning oven having a full glass inner panel that is capable of withstanding the high temperatures and extreme temperature differentials associated with a self-cleaning oven across its surface without breaking, while also being capable of fixing and supporting the full glass inner panel and absorbing shocks or impacts on the glass to comply with ratings agencies and industry/government standards. The exemplary embodiments can provide a self-cleaning oven door with a full inner glass surface that is glass and that is easy to wipe clean, thereby providing a clean aesthetic appearance. The exemplary self-cleaning oven door can include a suspension system that absorbs impact to the full glass inner panel to resist breakage of the ceramic panel. The exemplary self-cleaning oven door can increase an amount of space in the cooking chamber by eliminating the door "plunger," and thus, eliminating an intrusion of the door into the space within the oven chamber. The exemplary self-cleaning oven door also can reduce a number of glass panels needed to a suitable surface temperature of the door skin. The full glass inner panel of the exemplary self-cleaning oven door also can provide a clean cosmetic appearance that is desirable to many users.

The present invention further recognizes, however, that forming the inner glass panel of a door for a self-cleaning oven from a transparent ceramic material with a low coefficient of thermal expansion presents a unique set of difficulties and problems, which may not be present in ovens without self-cleaning features.

For example, the present invention recognizes that conventional devices for mounting a door latch for locking the range door during a self-cleaning process may not be suitable for a door having a full transparent ceramic inner panel extending from edge to edge of the door. A conventional oven door commonly includes a porcelain liner/plunger with cutouts such that an oven latch can engage and lock the range door in a closed position during the self-cleaning cycle. However, in the exemplary oven door described above, the oven door includes a full transparent ceramic inner panel extending from edge to edge of the door, and does not have a porcelain liner/plunger with cutouts.

The present invention addresses these problems by providing a latch retainer that is coupled to a surface of the door skin and that can replicate an interaction of a conventional porcelain liner/plunger with an oven latch to lock the range door for a self-cleaning process without a conventional porcelain liner/plunger. The latch retainer according to the exemplary embodiments can be attached to the door skin to maintain the appropriate spacing and strength needed to lock/latch the oven door in a closed position for the oven self-cleaning cycle. The latch retainer can be attached to a door skin of the door easily and efficiently, for example, using a plurality of fasteners such as two screws. In this manner, the exemplary latch retainer can replicate the conventional arrangement of a cutout on a porcelain liner/plunger in an inexpensive way that is easily produced, and moreover, easily repaired or replaced.

As a result, the latch retainer can permit the oven door to be locked securely such that a self-cleaning oven can be provided with a door having an inner surface made of a non-structural material such as a full glass inner panel. By enabling the use of the full glass inner panel, the present invention can provide an oven door that is easy to wipe and clean, increases an amount of space in the cooking chamber, reduces a number of glass panels needed to ensure a suitable surface temperature of the door skin, and provides an aesthetically pleasing appearance for marketing purposes.

For purposes of this disclosure, the term "inner glass" is defined as the glass panel of the door that is disposed on an inner side of the door that is closest to an opening of the oven chamber. The term "outer glass" is defined as the cosmetic glass panel of the door skin that is furthest from the opening of the oven chamber. The term "middle glass" is defined as a glass panel that is disposed between the inner glass and the outer glass.

Moreover, according to the present invention, an embodiment may control a temperature on the exterior of the self-cleaning oven door to be within acceptable limits such that a predetermined safe temperature can be maintained on the exterior surfaces of the door (e.g., door skin, outer glass, etc.), even at high self-cleaning temperatures associated with a self-cleaning process.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIGS. 6A-6D are a rear perspective view of a self-cleaning oven door, a partial perspective view of an edge retainer of the self-cleaning oven door taken at VI-B of FIG. 6A, a partial perspective side view of a hinge cover of the self-cleaning oven door taken at VI-C of FIG. 6A, and a partial perspective bottom view of a hinge cover of the self-cleaning oven door taken at VI-C of FIG. 6A, respectively, according to an exemplary embodiment of the invention.

FIGS. 9A-9C are a front plan view, a side view, and a partial perspective view of elements of an inner glass shock absorbing support system, respectively, and FIG. 9D is a partial cross-sectional view taken at section IX-D-IX-D of FIG. 9C according to an exemplary embodiment of the invention.

FIGS. 10A-10C are a partial perspective view of a door hinge assembly and a hinge retainer, a perspective view of a hinge retainer, and a front view of a hinge retainer of an inner glass shock absorbing support system, respectively, according to an exemplary embodiment of the invention.

FIG. 14 is a rear plan view of a partially assembled self-cleaning oven door having elements of a middle glass mounting system and elements of an outer glass mounting system according to exemplary embodiments of the invention.

FIG. 16 is a rear perspective view of a partially assembled self-cleaning oven door having upper and lower air ramps/guides according to an exemplary embodiment of the invention.

FIGS. 17A and 17B are rear perspective views of an upper and a lower air ramp/guide, respectively, according to an exemplary embodiment of the invention.

FIG. 18 is a rear perspective view of a partially assembled self-cleaning oven door having an outer glass mounting system according to an exemplary embodiment of the invention.

FIGS. 19A and 19B are a perspective view and an end view of an outer glass bracket according to an exemplary embodiment of the invention, and FIG. 19C is a perspective partial assembly view of an outer glass mounting system according to an exemplary embodiment of the invention.

FIG. 20 is a rear perspective view of a partially assembled self-cleaning oven door having elements of an outer glass mounting system according to an exemplary embodiment of the invention.

FIG. 21 is another rear perspective view of a partially assembled self-cleaning oven door having elements of an outer glass mounting system according to an exemplary embodiment of the invention.

FIGS. 22A and 22B are a perspective view and an end view, respectively, of an element of an outer glass mounting system according to an exemplary embodiment of the invention.

FIG. 23A is a perspective view of a door latch, and FIGS. 23B and 23C are partial perspective views of a latch system of a self-cleaning oven door according to an exemplary embodiment of the invention.

FIGS. 24A and 24B are partial perspective views of a latch system of a self-cleaning oven door according to an exemplary embodiment of the invention.

FIG. 25C is a cut-away, partial side view of a door having the hinge retainer assembly of FIG. 25A.

DETAILED DESCRIPTION OF THE EXEMPLARY EMBODIMENTS OF THE INVENTION

Figure 1A:
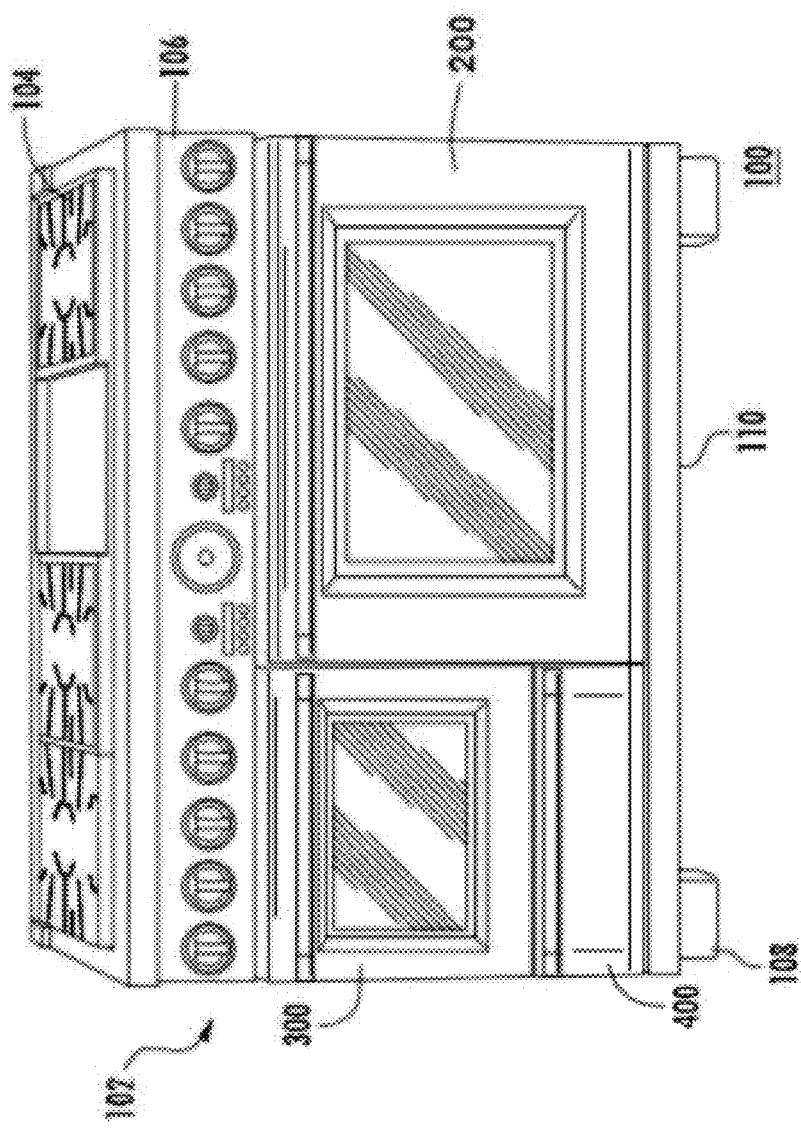
FIGS. 1A-1C are a front view, a side view, and a perspective view, respectively, of a household appliance according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-25C illustrate exemplary embodiments of a self-cleaning household appliance having an oven door with a latch retainer for a full glass inner door panel. Prior to describing the exemplary embodiments of the latch retainer in greater detail, and to provide a better understanding of the invention, this disclosure will first describe examples a self-cleaning household appliance and an exemplary oven door of a self-cleaning household appliance. Other features and components of the oven door, including examples of an inner glass suspension system, a middle mounting system, and an outer glass mounting system, also will be described following the description of the full glass inner panel to provide a better understanding of the overall arrangement and features of the exemplary oven door. To provide a better understanding of the invention, the description will start with the components of an innermost side of the door and progress toward the front door skin of the door.

Figure 1B:
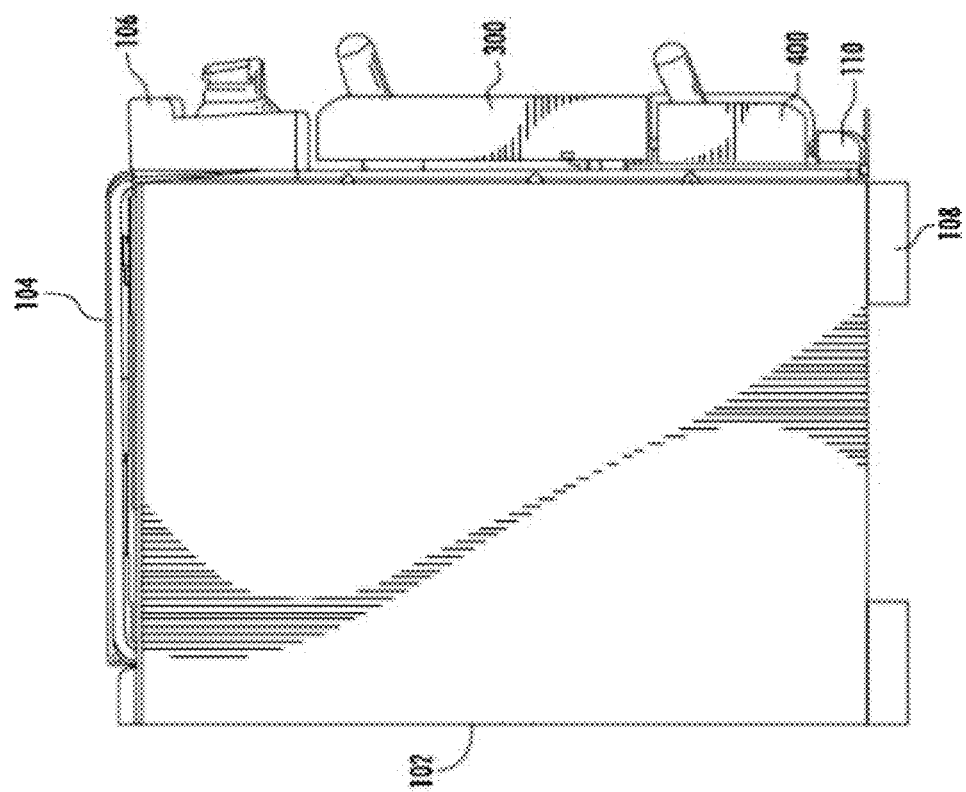
Figure 1C:
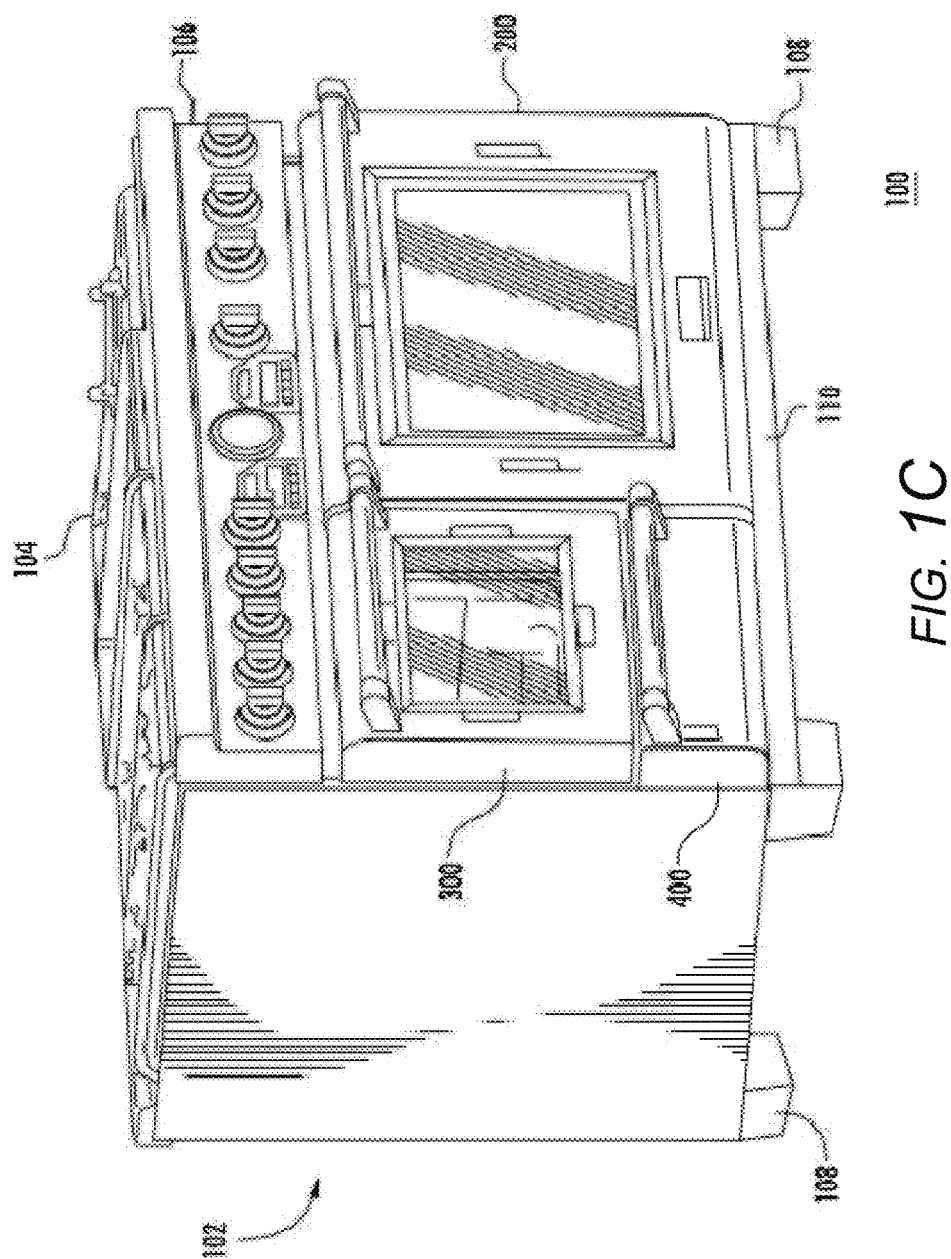

With reference to FIGS. 1A-1C, a household cooking appliance can include, for example, a gas cooking range 100 having a housing 102 including one or more cooking or warming devices, such as a cooktop, gas oven, electric oven, steam oven, convection oven, and/or warming drawer. In other embodiments, the appliance 100 can include one or more oven cooking chambers without a cooktop. In other embodiments, the appliance 100 can include a standalone appliance, wall mounted appliance, such as a stand-alone oven or wall mounted oven. For example, the appliance housing 102 can include a cooktop 104 and control panel 106. The cooktop 104 can include, for example, a gas cooktop having a plurality of gas burners, or other types of cooktops, such as an electric cooktop, an induction cooktop, or the like. The exemplary household appliance 100 can include one or more doors, such as a baking oven door 200, a steam oven door 300, and/or a warming drawer door 400 for providing access to one or more chambers of the housing 102. The housing 102 can include pedestal feet 108 for example for supporting the stand alone appliance and a kick panel 110.

Figure 2:
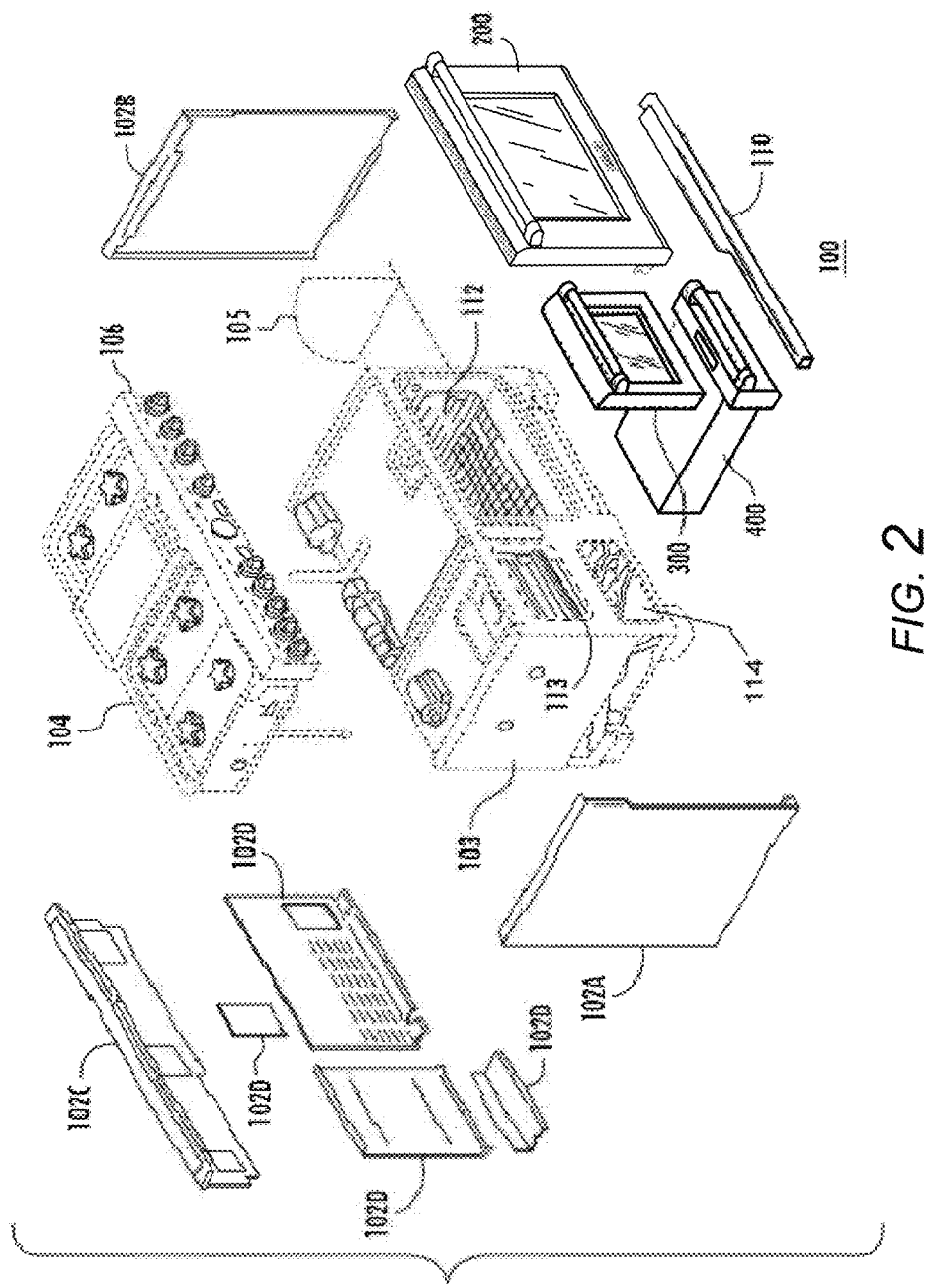
FIG. 2 is an exploded view of the exemplary household appliance of FIGS. 1A-1C.

Referring to FIG. 2, an exploded view of the appliance 100 of FIGS. 1A-1C includes housing parts 102A, 102B, 102C, 102D, the cooktop 104, and control panel 106, a baking oven door 200, a steam oven door 300, and a warming drawer door 400, and kick panel 110. For example, the housing of the exemplary household appliance 100 shown in FIG. 2 can include left-hand and right-hand sidewalls 102A, 102B and one or more rear panels 102D on a frame 103. The exemplary appliance 100 can include other devices and features, such as, for example, a backsplash or venting device 102C, hideaway label plate 105, etc. The frame 103 can include one or more chambers for cooking or warming devices, such as a baking oven chamber 112, steam oven chamber 113, and/or warming drawer chamber 114, each covered by the baking oven door 200, steam oven door 300, and warming drawer door 400, respectively.

Figures 3, 4:
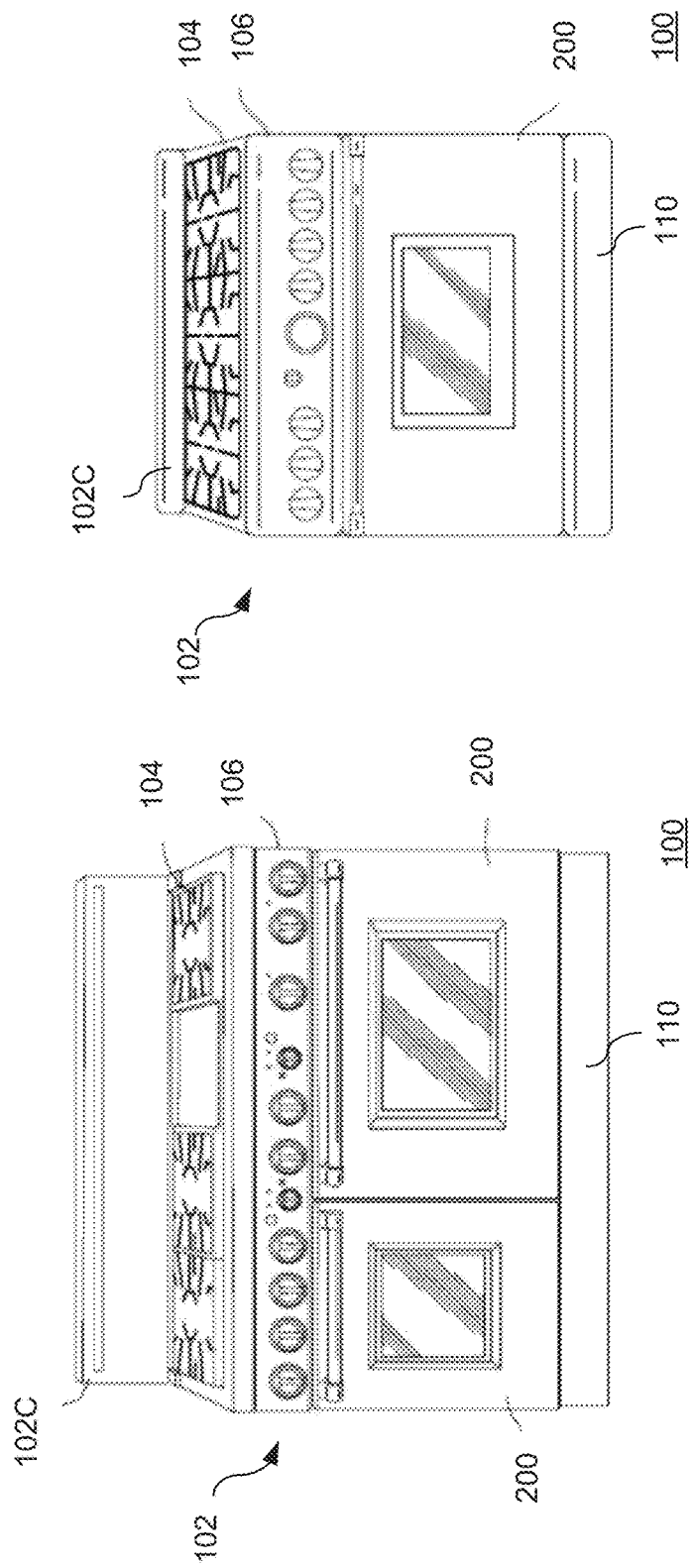
FIG. 3 is a front perspective view of a household appliance according to another exemplary embodiment of the invention.
FIG. 4 is a front perspective view of a household appliance according to another exemplary embodiment of the invention.

The exemplary embodiments are not limited to the oven 100 of FIGS. 1A-1C having the baking oven door 200, steam oven door 300, and warming drawer door 400, and can be applied to other appliances, such as the appliance 100 illustrated in FIGS. 3 and 4. Like reference numerals are used to identify the features of the embodiments of the appliance 100 in FIGS. 1A-4. The features shown in FIGS. 3 and 4 are similar to, or the same as, the features of FIGS. 1A-1C, and therefore, are not repeated.

Figure 5:
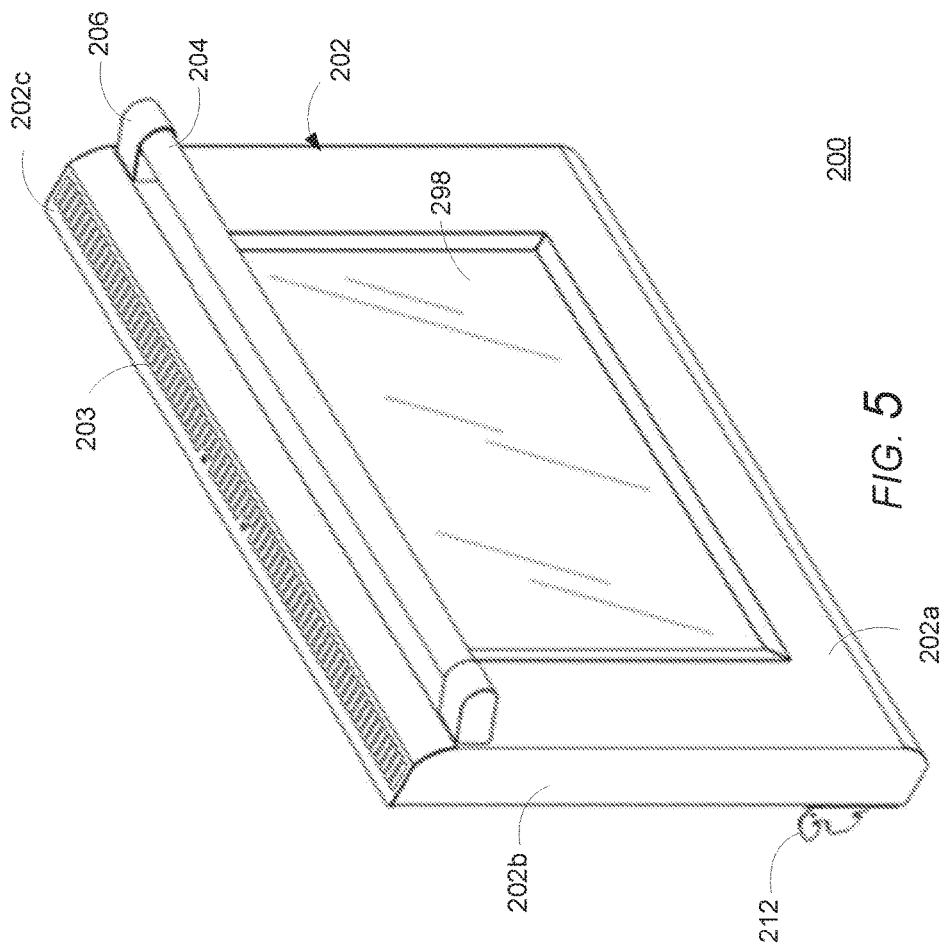
FIG. 5 is a front perspective view of a self-cleaning oven door according to an exemplary embodiment of the invention.

With reference to FIG. 5, an exemplary embodiment of a self-cleaning oven door 200 (as illustrated in the examples of FIGS. 1A-4) will now be described.

The self-cleaning oven door 200 can include a door skin 202 having a front surface 202a that faces away from the oven chamber, side surfaces 202b, a lower surface (not shown), and a top surface 202c. The top surface 202c can include a plurality of vents 203 for permitting air flow through the door. The door skin glass may be provided with or without a heat reflective coating. The door 200 can include a handle 204 supported from the door skin 202 by handle mounts 206. The door 200 can include an outer glass panel 298 and a plurality of interior glasses panels (e.g., middle glass, inner glass; not shown in FIG. 5) for viewing an interior of the oven chamber through the door 200 while keeping a temperature of the outer glass panel 298 at an acceptable temperature. The door 200 can include hinge claws 212 to facilitate pivoting of the door 200 with respect to the appliance housing for opening and closing the oven chamber.

Figure 6A:
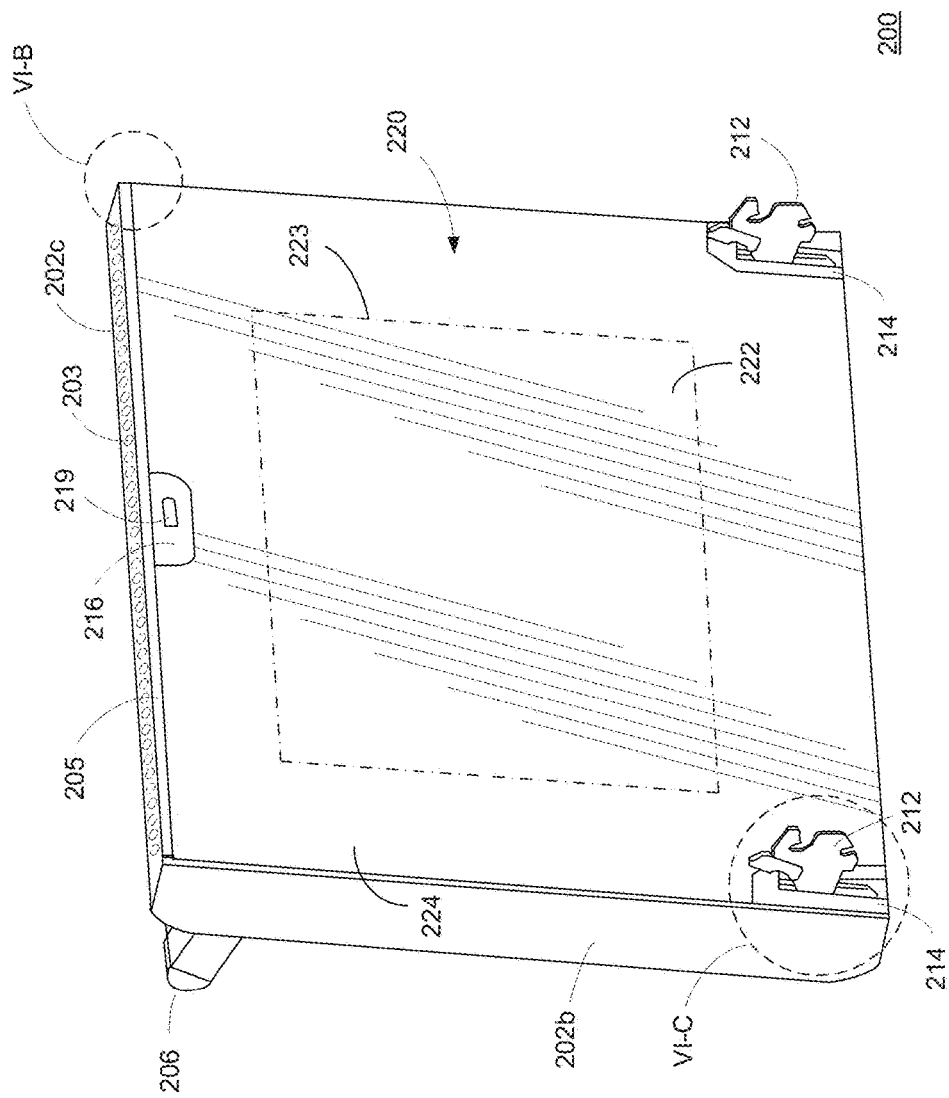
Figure 7:
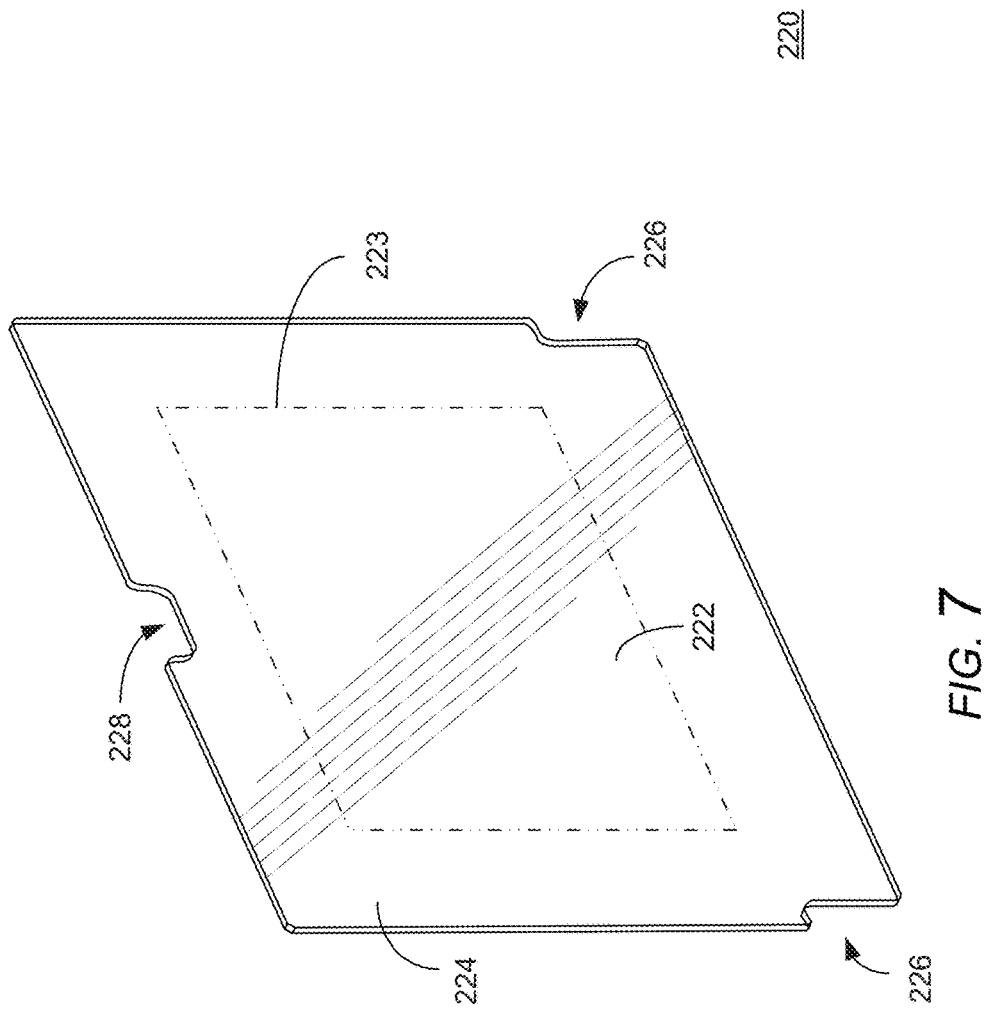
FIG. 7 is a rear perspective view of a transparent ceramic inner panel of a self-cleaning oven door according to an exemplary embodiment of the invention.

With reference to FIG. 6A, an exemplary embodiment of the door 200 of FIG. 5 can include a full glass panel formed by a transparent ceramic inner panel 220 (e.g., a full glass ceramic inner panel, which is shown in greater detail in FIG. 7). The door 200 can include a lip 205 extending for example along an inner edge of the top surface 202c. The lip 205 can be integrally formed with the top surface 202c or formed as a separate component coupled to the top surface 202c. The top surface 202c can include a latch cover 216 having a guide opening 219 for receiving and guiding a door lock to a latch plate (not shown), which may be disposed under the latch cover 216. The latch cover 216 can be integrally formed with the top surface 202c or formed as a separate part. As shown in FIG. 6A, the door 200 can include hinge covers 214 that are adjacent to or surround the hinge claws 212, which facilitate pivoting of the door 200 with respect to the appliance housing for opening and closing the oven chamber. The hinge cover 214 can include an opening for accommodating the hinge claw 212 and also covering portions of a hinge assembly within the door 200 from view. The hinge cover 214 can be formed, for example, from metal such as stainless steel. The hinge cover 214 also can be part of a system that retains the ceramic transparent panel 220 in the door 200 by restraining the panel 200 at the bottom of the door 200 while at the same time covering the hinge assembly, as described in more detail with reference to FIGS. 6B-6D.

With reference again to FIG. 6A, an example of a transparent ceramic inner panel 220 includes a first inner portion 222 that is disposed adjacent to an area within a gasket (not shown) surrounding the opening of the oven chamber opening (e.g., 112 in FIG. 2) and sealing the door 200 to the opening. The area of the transparent ceramic inner panel 220 that contacts and seals against the gasket (not shown) when the door 200 is closed is exemplarily illustrated by the dashed line 223. The transparent ceramic inner panel 220 includes a second, outer or perimeter portion 224 that is disposed adjacent to an area of the oven outside of the gasket (not shown) that surrounds the opening to the oven chamber, or in other words, outside the area illustrated by the dashed line 223. As a result of this arrangement, during a self-cleaning operation, the first inner portion 222 is subjected to heating to the self-cleaning temperature along with the oven chamber, while the second, outer or perimeter portion 224 remains at or near room temperature, thereby subjecting the transparent ceramic inner panel 220 to a large temperature differential between portions 222 and 224. As shown in FIG.

6A, the transparent ceramic inner panel 220 can extend substantially from edge to edge of the door 200 in both the width direction and the height direction of the door 200 (i.e., from side 202b to side 202b in the width direction and from the top surface 202c to the bottom surface (202d in FIG. 6D) in the height direction). In other embodiments, the transparent ceramic inner panel 220 may be configured to extend to an area adjacent to one or more of the sides, top, and bottom of the door that is outside of the area illustrated by the dashed line 223.

With reference to the enlargements VI-B and VI-C of FIG. 6A, which are illustrated in FIGS. 6B-6D, the exemplary door 200 can be assembled by inserting a top edge of the transparent ceramic inner panel 220 under the lip 205 of the top surface 202c and then resting the transparent ceramic inner panel 220 into position, as shown in FIG. 6B. Each of the hinge covers 214 then can be installed over at least a portion of each lower corner of the transparent ceramic inner panel 220 and coupled to the lower surface 202d of the door 200 using fasteners, such as one or more screws, as shown in FIGS. 6C and 6D. The hinge cover 214 can include, for example, a side portion that is disposed adjacent to the side 202b and secures the transparent ceramic inner panel 220 in a dimension extending in a direction of a width of the door (i.e., from side 202b to side 202b). The hinge cover 214 also can include, for example, a bottom portion that is disposed adjacent to the bottom 202d and secures the transparent ceramic inner panel 220 in a first vertical direction of a height of the door extending from the top 202c toward the bottom 202d. The lip 205 can secure the transparent ceramic inner panel 220 in a second vertical direction of the height of the door extending from the bottom 202d toward the top 202c. In this way, the transparent ceramic inner panel 220 can be secured in all three dimensions by the combination of the lip 205 and the hinge cover 214, for example, without openings or fasteners extending through the transparent ceramic inner panel 220. In an embodiment, a suitable amount of clearance can be provided between the transparent ceramic inner panel 220 and the lip 205 and/or the hinge cover 214 such that the transparent ceramic inner panel 220 can "float" in the mounted position to allow for some movement for impact absorption and/or growth/expansion of the panel 220 during heating.

With reference to FIG. 7 an exemplary embodiment of the transparent ceramic inner panel 220 will now be described.

The transparent ceramic inner panel 220 can include a first inner portion 222 that is disposed adjacent to an area within a gasket (not shown) surrounding the opening of the oven chamber opening (e.g., 112 in FIG. 2) and sealing the door 200 to the opening. The area of the transparent ceramic inner panel 220 that contacts and seals against the gasket (not shown) when the door 200 is closed is exemplarily illustrated by the dashed line 223. The transparent ceramic inner panel 220 can include a second, outer or perimeter portion 224 that is disposed adjacent to an area of the oven outside the area illustrated by the dashed line 223. In this example, the transparent ceramic inner panel 220 can include a hinge cutout 226 at each lower corner for accommodating or providing clearance for the door hinges, for example, without having openings or components, such as a hinge or screw, penetrating the transparent ceramic inner panel 220. The hinge cutout 226 at each corner also can provide a surface for engaging the hinge covers (shown in FIGS. 6A-6D) to secure the transparent ceramic inner panel 220 in two dimensions. The transparent ceramic inner panel 220 can include a latch cutout 228 formed in a top edge of the panel 220 for accommodating or providing clearance for a door latch (not shown in FIG. 7), for example, without having openings or components, such as a latch or screw, penetrating the transparent ceramic inner panel 220.

The transparent ceramic inner panel 220 can have a low coefficient of thermal expansion capable of withstanding large temperature differentials across an entire surface without breaking. More particularly, the transparent ceramic inner panel 220 can be formed by a transparent ceramic material commonly used, for example, for fireplace glass (e.g., Robax® or Resistan™, manufactured by SCHOTT North America, Inc.), which can withstand large temperature differentials across its surface without breaking, and thus, may withstand the first inner portion 222 of the full glass inner surface being subjected to heating to the self-cleaning temperature while the second, outer or perimeter portion 224 of the full glass inner surface remains at or near room temperature. In another embodiments, the transparent ceramic inner panel 220 may include a coating such as a heat reflective coating (e.g., Energy Plus coating), which commonly may be used on fireplace glass, to assist with minimizing or reducing an external surface temperature of the door to an acceptable level.

With reference to FIGS. 8-11, an exemplary embodiment of an inner glass shock absorbing support system will now be described.

Figure 8:
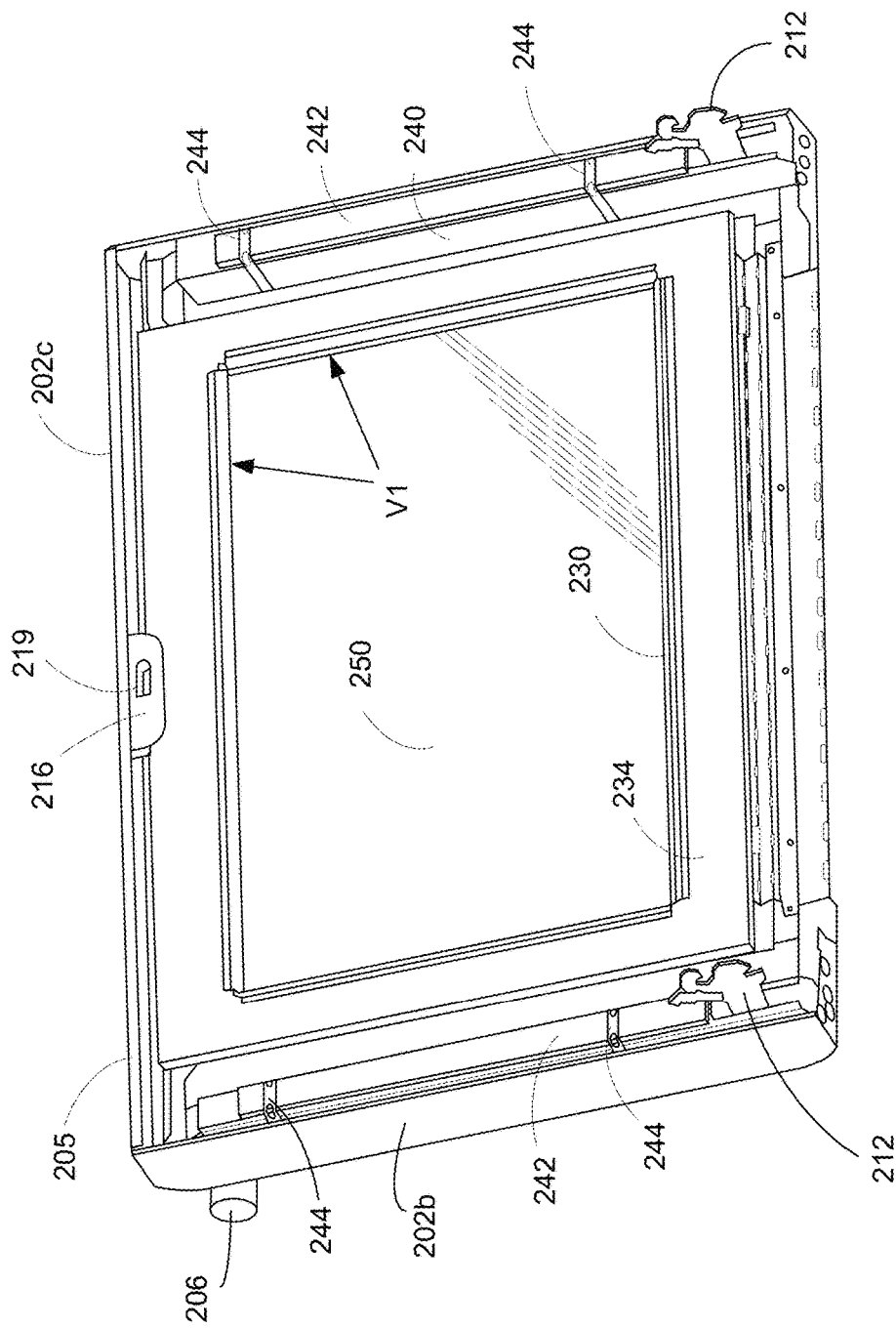
FIG. 8 is a rear perspective view of a partially assembled self-cleaning oven door having an inner glass shock absorbing support system according to an exemplary embodiment of the invention.

FIG. 8 illustrates the door 200 with the transparent ceramic inner panel 220 removed. As shown in FIG. 8, the door 200 can include an inner glass shock absorbing support system having an energy absorbing support means (e.g., shock absorbing support means, such as 230 or 230 in combination with 234 and/or 242, 244) for evenly, flexibly, and resiliently supporting the transparent ceramic inner panel 220 in a manner that permits the transparent ceramic inner panel 220 to "float" in the mounted position to allow for some movement for shock/impact absorption. In this way, the shock absorbing support means can absorb and distribute forces (e.g., shock or impact forces from a dropped pot or pan, etc.) exerted on the transparent ceramic inner panel 220 to prevent the panel 220 from breaking or fracturing and to enable the panel 220 to comply with ratings agencies and industry/government standards.

More particularly, the shock absorbing support means can include, for example, one or more flexible, compressible, or resilient parts or mounts configured to absorb and distribute forces exerted on the transparent ceramic inner panel 220, such as forces exerted by a user dropping a pot or pan on the open door while loading or unloading the cooking appliance. In the example illustrated in FIG. 8, the shock absorbing support means can include a flexible, deflectable, or resilient metal support 230 or the like for suspending the transparent ceramic inner panel 220 within the door 200 in a manner that flexibly supports a surface of the transparent ceramic inner panel 220 and that permits the transparent ceramic inner panel 220 to "float" in the mounted position to allow for some movement for impact absorption. An example of a deflectable metal support 230 will be described in greater detail with reference to FIGS. 9A-9D.

The shock absorbing support means further can include a first insulation layer 234 surrounding the deflectable metal support 230. The first insulation layer 234 can be secured using one or more hangers (not shown) that suspend the first insulation layer 234 in position from one or more components of the door 200. A portion of the first insulation layer 234 can flexibly and resiliently support an interior surface of the transparent ceramic inner panel 220. A portion of the first insulation layer 234 optionally can extend under at least a portion of the deflectable support 230. The first insulation layer 234 also can assist with reducing heat transfer from the transparent ceramic inner panel 220 to the other components of the door, such as the middle glass panel or outer glass panel, thereby assisting with reducing the temperature of the outer glass panel. The first insulation layer 234 can function alone or in cooperation with the deflectable metal support 230. An example of a shock absorbing support means including a deflectable metal support 230 and insulation layer 234 will be described in greater detail with reference to FIGS. 9A, 9B, and 9D.

With reference again to FIG. 8, the door 200 can include a hinge assembly 240 on each side, such as an off-the-shelf hinge assembly. The shock absorbing support means further can include a second insulation layer 242 disposed on a surface of each hinge assembly 240 that flexibly supports an interior surface of the transparent ceramic inner panel 220. The second insulation layer 242 can be secured to the hinge assembly 240 using, for example, one or more movable or resilient insulation retainers 244, which will be described in greater detail with reference to FIGS. 10A-10C.

As shown in FIG. 8, the transparent ceramic inner panel 220 can be supported at a plurality of locations by one or more of a deflectable metal support 230, a first insulation layer 234, a second insulation layer 242, and/or an insulation retainer 244. One of ordinary skill in the art will recognize that all of the support means are not necessary and various combinations of these elements can support the transparent ceramic inner panel 220 in a "floating" manner (i.e., movable manner) to provide impact absorption. The door 200 also can include additional or alternative flexible support means in combination with the illustrated examples. The present invention is not limited to the illustrated examples and other flexible support means are contemplated by the present invention. According to the exemplary embodiment, the shock absorbing support means can provide controlled movement (e.g., limited controlled movement) to absorb energy exerted on the transparent ceramic inner panel 220 and prevent breakage of the transparent ceramic inner panel 220.

An exemplary embodiment of a deflectable metal support 230, which may form a part of the inner glass shock absorbing support system, will now be described with reference to FIGS. 9A-9D.

As shown in FIGS. 9A-9D, the inner glass shock absorbing support system can include a support 230 formed for example by a thin, flexible metal support frame disposed around a perimeter of a viewing area through the glass panels of the door 220. In the example, the support 230 includes a rectangular frame having a plurality of sides 230a, 230b, 230c, and 230d. The sides of the support 230 can be integrally formed or coupled together to form a frame. The exemplary embodiment is illustrated with a rectangular-shaped frame. However, the frame can have other shapes, such as a circular-shaped frame. In other embodiments, the support 230 can be formed from separate elements that are not linked together. For example, the sides 230a, 230b, 230c, and 230d can be individually mounted or suspended within the door to flexibly support areas or regions of the panel 220.

With reference again to the example support 230 illustrated in FIGS. 9A-9D, the sides 230a, 230b, 230c, and 230d can be shaped such that a portion of the sides 230a, 230b, 230c, and 230d is capable of flexing, deflecting, or otherwise moving when a force or impact force is exerted on the support 230 to absorb or distribute the forces and prevent breakage of the transparent ceramic inner panel 220.

As shown in FIGS. 9A-9D, a first insulation layer 234 optionally can extend around a perimeter of the support 230. The first insulation layer 234 can include an opening that corresponds to a perimeter size and shape of the support 230 such that the first insulation layer 234 fits snugly around the support 230. The first insulation layer 234 can have a uniform thickness to evenly support the underside of the transparent ceramic inner panel 220. In other embodiments, the insulation layer 234 can have an uneven thickness, for example, to provide additional support or impact absorption in particular areas, such as areas that are more highly prone to impact forces or areas that are directly supported by other shock absorbing support means such as the support 230. As shown in FIGS. 9A and 9B, the sides 230a, 230b, 230c, and 230d can have a size and shape such that at least a portion of the first insulation layer 234 is disposed under a portion of one or more of the sides 230a, 230b, 230c, and 230d. The portion of the first insulation layer 234 can provide additional support and/or resiliency for the portion of the sides 230a, 230b, 230c, and 230d.

As shown in the example illustrated in FIGS. 9A-9D, each of the sides 230a, 230b, 230c, and 230d can include a wall (e.g., a vertical or angled wall) on a side facing an interior of the support 230, with the first insulation layer 234 being disposed on an outside of the vertical wall. In this way, the sides 230a, 230b, 230c, and 230d of the support 230 can be configured to block the interior edges of the first insulation layer 234 from view through the viewing area of the glass panels (see e.g., V1 in FIG. 8), thereby improving the cosmetic appearance of the door.

As shown in FIG. 9C, the support 230 can be formed from a thin metal part or thin, perforated metal part such that the support 230 can flex at one or more locations to absorb impact energy. For example, the support 230 can formed or bent in a way that permits the support to flex at one or more locations. In other examples, the support 230 can include a plurality of perforations or slots 231 disposed between connecting portions 232. In this example, the perforations are oriented in a lengthwise direction of the support, thereby enabling the support 230 to be flexible along the entire length of the support to evenly support the transparent ceramic inner panel 220. The perforations or slots 231 and connecting portions 232 can be disposed, for example, along a bend in the support 230 such that the support 230 can easily flex or fold along the bend. By providing a thin support or a support with perforations or slots 231, the embodiments can provide an additional advantage of reducing an amount of material of the support 230, which may minimize or reduce an amount of heat absorbed by the support 230, for example, when the oven is at high temperatures such as self-cleaning temperatures. In this way, the exemplary support 230 can minimize an effect of the support 230 acting like a heat sink, and thereby assist with keeping the exterior surface of the door cool.

As schematically illustrated in FIG. 9D, the support 230 can include a plurality of portions configured to be flexible or movable to absorb a force exerted on the transparent ceramic inner panel 220. The support 230 can be disposed between the transparent ceramic inner panel 220 and a middle glass panel 250 of the door. The insulation layer 234 can be disposed such that at least a part of the layer 234 is disposed under a portion of the support 230. In operation, when a force F is exerted on the transparent ceramic inner panel 220, for example in a direction shown by the arrows in FIG. 9D, the support 230 can flex or move in the direction of the force F, thereby permitting the transparent ceramic inner panel 220 to move downward in the direction of the force F and absorbing the impact on the transparent ceramic inner panel 220 to prevent breaking of the transparent ceramic inner panel 220. The support 230 and/or the surface of the transparent ceramic inner panel 220 can push against the first insulation layer 234 to compress the first insulation layer 234, thereby further absorbing the impact energy on the transparent ceramic inner panel 220. The support 230 and/or the first insulation layer 234 can function as a spring system or a spring/damper system for absorbing the impact forces on the transparent ceramic inner panel 220.

One of ordinary skill in the art will recognize that the support 230 can be configured in a variety of ways and can have a variety of sizes and shapes configured to provide impact absorption and/or to cooperate with the insulation layer 234. The support 230 can include linear portions or curved portions that permit the support 230 to flex. The support can include a plurality of portions configured to flex or deflect under the influence of one or more predetermined amounts of force. For example, an outer portion of the support 230 may be configured to flex under less force than an inner or middle portion of the support. In other embodiments, an outer portion of the support 230 may be configured to flex under greater force than an inner or middle portion of the support. The support 230 can include a plurality of different portions or flexible areas and is not limited to the example arrangement illustrated in FIGS. 9A-9D. The support 230 can have a uniform thickness or a plurality of portions having a different thickness, for example, to facilitate flexing or deflecting upon the application of different amounts of force. The support 230 can include a plurality of perforations, slots, or cutouts to reduce an amount of material, and thereby, minimize or reduce an effect of the support 230 acting as a heat sink. In other embodiments, the support 230 can be formed of a thin metal to minimize a heat sink effect such that perforations, slots, or cutouts are not necessary. The support 230 can be coated with a reflective material or have a reflective color that minimizes or prevents the support 230 from absorbing heat, thereby assisting with keeping the external surface of the door cool. The support 230 can be formed from a metal, such as 300 annealed stainless steel. The support 230 can include one or more corresponding slots or other features for engaging one or more hangers or other components of the door to suspend the support 230 in position. The support 230 can be configured to have a portion that blocks the interior edges of the first insulation layer 234 from view through the viewing area of the glass panels (see e.g., V1 in FIG. 8), thereby improving the aesthetic appearance of the door. The support 230 can be selected from a material that discolors evenly when heated, thereby improving the cosmetic appearance of the door, for example, during a self-cleaning process when the elements of the door are subjected to heating. In other embodiments, the insulation can be disposed on an opposite side of the support 230. In this case, a separate part may be provided to block the insulation 234 from view through the viewing area of the glass panels.

An exemplary embodiment of a second insulation layer and an insulation retainer 244, which may form a part of the inner glass shock absorbing support system, will now be described with reference to FIGS. 10A-10C.

In the exemplary embodiments, the transparent ceramic inner panel 220 extends from edge to edge of the door. Therefore, a part of the transparent ceramic inner panel 220 on each side will be disposed over each hinge assembly 240 (compare FIGS. 6A and 8). As shown in FIG. 10A, the inner glass shock absorbing support system can include a second insulation layer 242 disposed between a surface of the hinge assembly 240 and the transparent ceramic inner panel 220 to provide impact absorption and also to prevent or minimize a likelihood of the transparent ceramic inner panel 220 contacting the firm or rigid surface of the hinge assembly 240 when the transparent ceramic inner panel 220 is subjected to impact forces. The second insulation layer 242 can have a uniform thickness along the length of the hinge assembly 240 such that it evenly supports the panel 220 and can be configured to compress under the force of the transparent ceramic inner panel 220.

The second insulation layer 242 can be secured to the surface of the hinge assembly 240 to prevent the layer 242 from moving, sliding, or being displaced by the motion of the door during opening or closing or by the force of the transparent ceramic inner panel 220 pressing against the layer 242. In one embodiment, the second insulation layer 242 can be glued to the surface of the hinge assembly 240. One of ordinary skill in the art will recognize that adhesives or glue may emit undesirable or unpleasant odors during heating to high temperature, such as a temperature associated with a self-cleaning process. As shown in FIG. 10A, another embodiment eliminates the need to use adhesives or glue by providing one or more insulation retainers 244 disposed on the hinge assembly 240 to secure the second insulation layer 242 in place. The second insulation layer 242 can be secured between the insulation retainer 244 and a surface of the hinge assembly 240. The insulation retainers 244 can be configured to flex or deflect, or to be movable or slidable, in the direction shown by the arrows in FIG. 10A such that the transparent ceramic inner panel 220 does not contact a firm surface that may cause the panel 220 to break. The second insulation layer 242 correspondingly can compress upon the exertion of forces by the transparent ceramic inner panel 220 on the insulation layer 242 and/or the insulation retainer 244.

As shown in FIGS. 10B and 10C, the insulation retainer 244 can include a body having a top portion 502 that is flush with an underside of the transparent ceramic inner panel 220 and an upper surface of the insulation layer 242 and the hinge assembly 240. The insulation retainer 244 can include a pair of opposing leg portions 504 that extend along the sides of the hinge assembly 240. A length of each of the leg portions 504 can be greater than a height of the side of the hinge assembly 240 such that an end of each leg portion 504 extends past a bottom of the hinge assembly 240. The end of each leg portion 504 can include a free end 506 that wraps around at least a portion of the wall of the hinge assembly 240 to prevent the retainer 244 from dislodging from the hinge assembly 240. For example, the free end 506 illustrated in FIGS. 10B and 10C can have a substantially U-shaped portion that extends up along an interior of the side of the hinge assembly 240. In other embodiments, the free end 506 can be an L-shaped portion, V-shaped portion, etc. Alternatively, the free end 506 can be pressure fit on an outside surface of the hinge assembly 240 or engage a slot or groove in the hinge assembly 240, for example, if the retainer 244 is configured to move up or down upon impact by the transparent ceramic inner panel 220. The retainer 244 can include one or more perforations, cutouts, or slots (e.g., 503, 505) for providing areas of the retainer 244 that easily flex or move when a force is applied to the retainer 244. The perforations, cutouts, or slots (e.g., 503, 505) also can reduce an amount of material of the retainer 244, thereby reducing an effect of the retainer 244 acting as a heat sink during heating of the oven chamber, such as during a self-cleaning process. In yet another embodiment, the retainer 244 can be configured to be fixed with respect to the hinge assembly 240 and include a flexible or deflectable top portion 502 to absorb an impact or force exerted by the transparent ceramic inner panel 220 and to prevent the transparent ceramic inner panel 220 from contacting a firm surface.

As shown in FIG. 10C, the second insulation layer 242 can be disposed between the top portion 502 of the hinge retainer 244 and the upper surface of the hinge assembly 240. In operation, when a force F is applied, the transparent ceramic inner panel 220 moves downward against the retainer 244 and the second insulation layer 242. The retainer 244 can be configured to move downward along with the transparent ceramic inner panel 220 and compress the second insulation layer 242 toward the surface of the hinge assembly 240, thereby absorbing the force F exerted on the panel 220 and preventing the panel 220 from contacting the rigid surface of the hinge assembly 240. As shown in FIG. 10C, the free ends 506 of the retainer 244 can be configured to extend past the ends of the hinge assembly 240 such that a space S1 is present. The space S1 can provide sufficient clearance for the retainer 244 to move in the direction of the force F toward the hinge assembly 240 and back to an original position due to the resiliency of the second insulation layer 242. The space S1 also can permit the retainer 244 to be easily and simply installed over the second insulation layer 242 during assembly, thereby reducing manufacturing costs and time.

Figure 11:
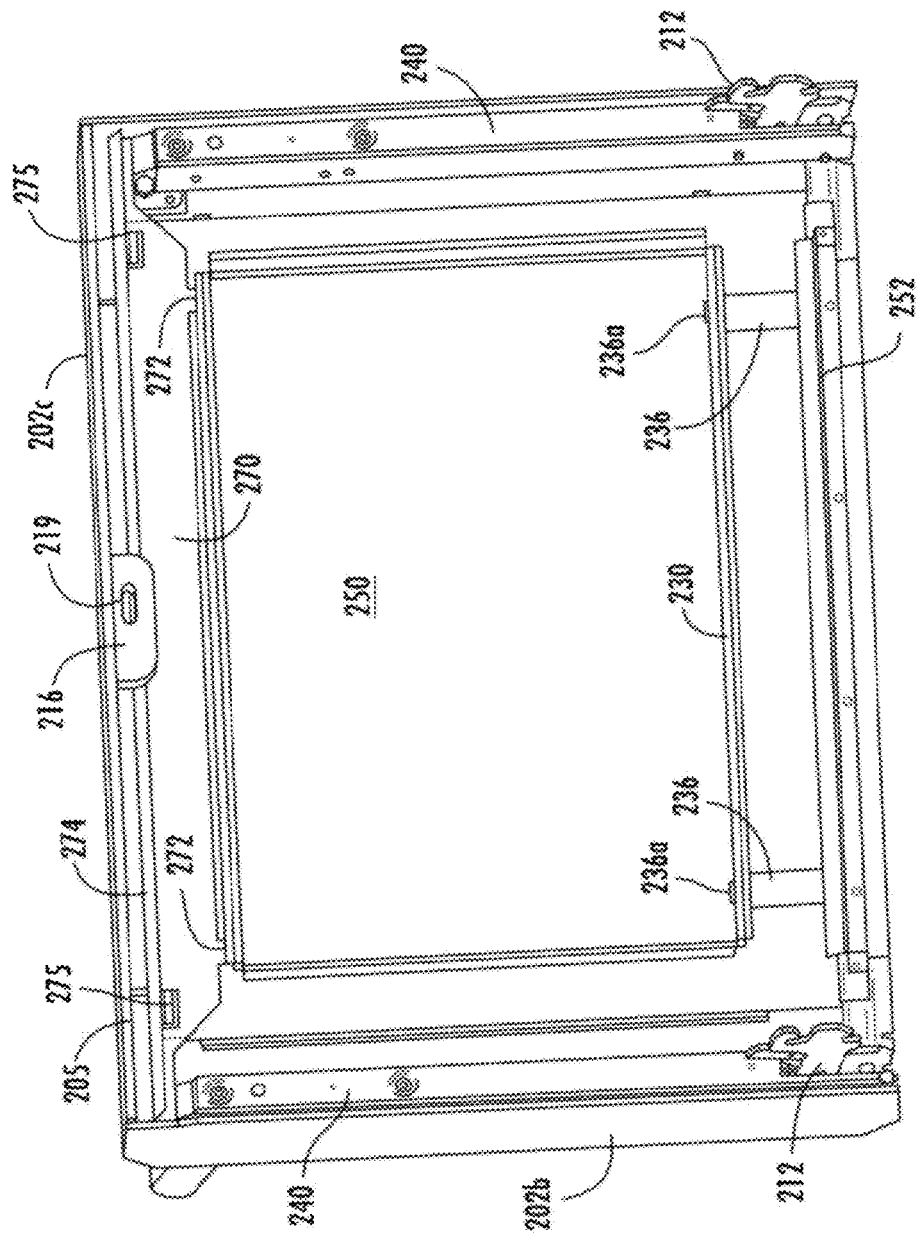
FIG. 11 is another rear perspective view of a partially assembled self-cleaning oven door having elements of an inner glass inner glass shock absorbing support system according to an exemplary embodiment of the invention.
Figure 12:
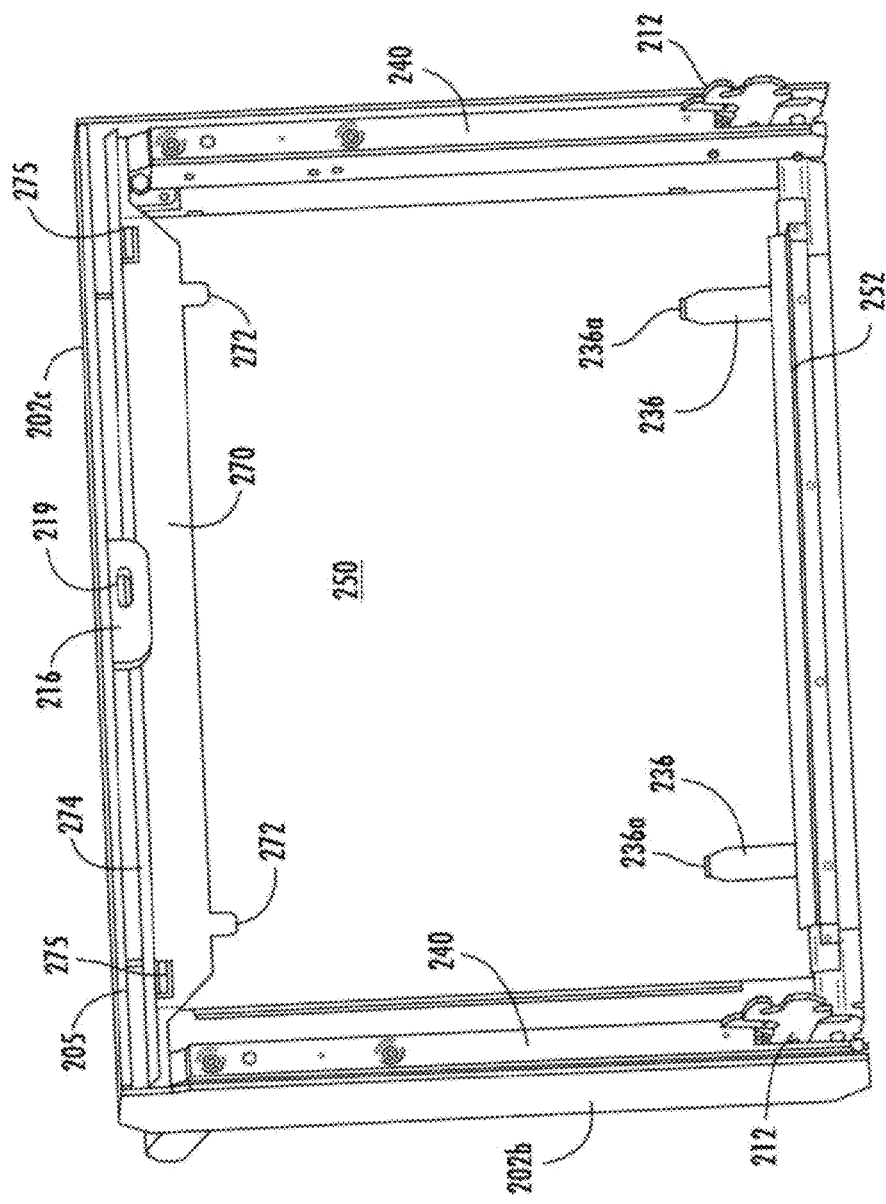
FIG. 12 is a rear perspective view of a partially assembled self-cleaning oven door having elements of an inner glass shock absorbing support system and elements of a middle glass mounting system according to exemplary embodiments of the invention.

With reference to FIGS. 11 and 12, an exemplary embodiment of a top reflector 270 and a lower retainer 252, each of which may form a part of the inner glass shock absorbing support system and/or a part of the middle glass mounting system, will now be described.

FIG. 11 shows the partial door assembly without the first insulation layer, the second insulation layer, and the insulation retainers such that the middle glass panel 250 is visible. FIG. 12 further shows the partial door assembly without the flexible support 230. As shown in FIG. 11, the door 200 can include a top reflector 270 that extends across a top portion of the door and may reflect heat, couple the hinge assemblies 240 to each other, and hide the first insulation layer (234 in FIG. 8). The top reflector 270 can include one or more hooks, tabs, or hangers 272 (e.g., "wreath hangers") for engaging one or more corresponding slots (e.g., 231 in FIG. 9C) formed in the deflectable metal support 230. The hooks 272 can be integrally formed with the top reflector 270 or separate from the top reflector 270. As shown in FIG. 11, the hooks 272 of the top reflector 270 can be used to suspend the deflectable metal support 230 in the door assembly. The top reflector 270 can reflect heat (e.g., infrared (IR) heat) at the top of the door (which generally is the part of the door that is exposed to the most oven heat) back towards the oven cavity. As show in FIGS. 11 and 12, the top reflector 270 can include fixation points that can be coupled to a top end of each hinge assembly 240 to stabilize and fix a position and spacing of the hinge assemblies 240. The top reflector 270 can include a flange 274 or other part that blocks a view of the first insulation layer (234 in FIG. 8) from being visible when viewed through the vents (203 in FIG. 6A) the top surface 202c of the door 200. The top reflector 270 also can serve as an upper stop for the first insulation layer (234 in FIG. 8) to prevent the insulation layer from drifting upward out of place. The top reflector 270 can include one or more openings or slots 275 for engaging a wing, tab, clip or other fastening means on the left-hand and right-hand brackets (280 shown in FIGS. 14-15D) for coupling the left-hand and right-hand brackets to the top reflector 270.

With reference again to FIGS. 11 and 12, the door 200 can include a lower retainer 252. The lower retainer 252 can be coupled to left-hand and right-hand brackets (280 shown in FIGS. 14-15D) to stabilize and fix the left-hand and right-hand brackets with respect to each other. The lower retainer 252 can include one or more integral or separately formed hangers 236 (e.g., "wreath hangers") having hooks 236a for engaging one or more corresponding slots (e.g., 231 in FIG. 9C) formed in a lower side of the deflectable metal support 230. As shown in FIG. 11, the hooks 236a can be used to suspend the deflectable metal support 230 in position in the door assembly. In this way, the lower retainer 252 may form a part of the inner glass shock absorbing support system.

The lower retainer 252 can secure the middle glass in two dimensions, such as up-down and forward-back. The lower retainer 252 can serve as a lower stop for the first insulation layer (234 in FIG. 8) to prevent the middle glass panel 250 and the insulation layer from drifting downward out of place. The lower retainer 252 also can include a flange, wall, or other part that blocks a view of the first insulation layer (234 in FIG. 8) from being visible when viewed through the bottom surface of the door 200.

Figure 13:
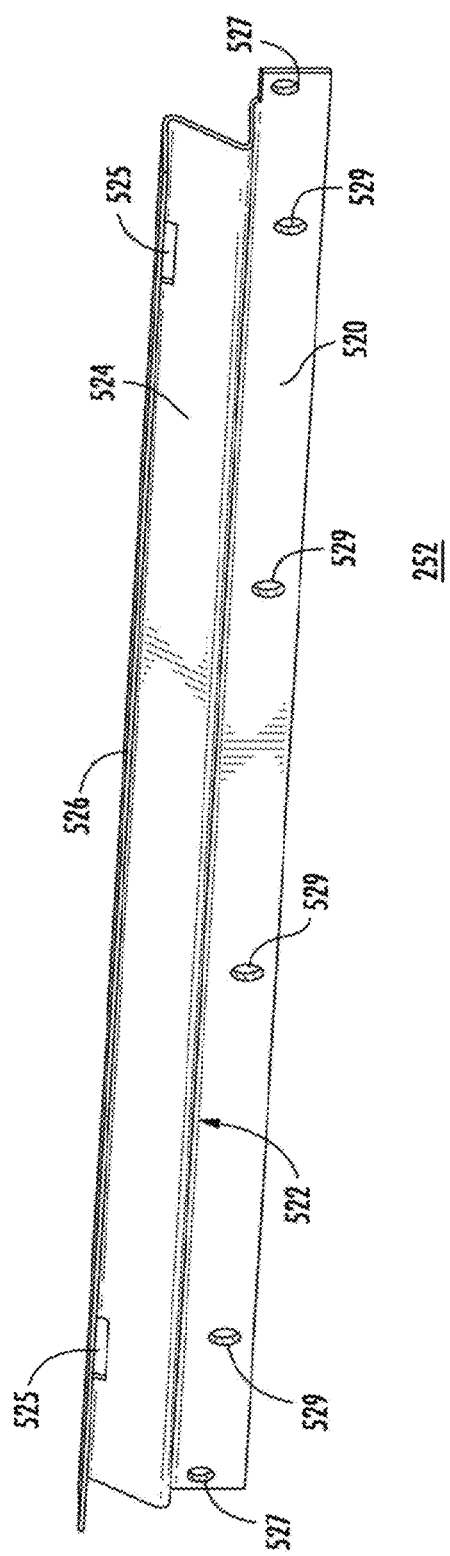
FIG. 13 is a perspective view of a lower retainer of a middle glass mounting system according to an exemplary embodiment of the invention.

With reference to FIG. 13, an exemplary embodiment of a lower retainer 252 can include a generally Z-shaped retainer having a base portion 520 having a plurality of first fastening means for coupling the lower retainer 252 to the door assembly. In the example, the first fastening means can include openings 529 for receiving threaded studs or the like for coupling the lower retainer 252 to the door assembly. The base portion 520 also can include a plurality of second fastening means, such as openings 527, for receiving one or more screws or the like for coupling the lower retainer 252 to the left-hand and right-hand brackets (280 shown in FIGS. 14-15D), thereby stabilizing and fixing the left-hand and right-hand brackets with respect to each other. The lower retainer 252 can include a Z-shaped portion formed by walls 522, 524, and 526. The Z-shaped portion can serve to fix a lower end of the middle glass panel 250 in place and prevent the middle glass panel 250 and the insulation layer from drifting downward out of place.

With reference again to FIG. 13, the lower retainer 252 can include one or more slots 525 or other means for coupling one or more hangers 236 (e.g., "wreath hangers") having hooks 236a for engaging one or more corresponding slots (e.g., 231 in FIG. 9C) formed in a lower side of the deflectable metal support 230. The hooks 236a can be used to suspend the deflectable metal support 230 in position in the door assembly. In this way, the lower retainer 252 may form a part of the inner glass shock absorbing support system.

Figure 15D:
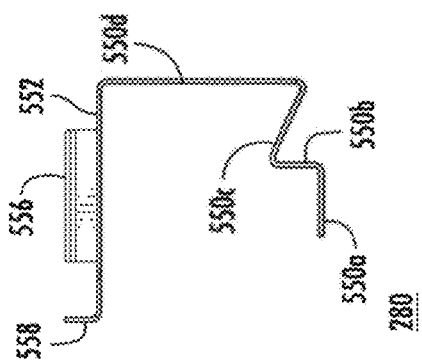
FIGS. 15A-15D are a side perspective view of a left-hand side bracket, a side view of a left-hand side bracket, a side perspective view of a right-hand side bracket, and an end view of a left-hand side bracket, respectively, of a middle glass mounting system and an outer glass mounting system according to exemplary embodiments of the invention.

With reference again to FIGS. 12 and 13, and with further reference to FIGS. 14-15D, an exemplary embodiment of a middle glass mounting system will now be described. The middle glass mounting system can be configured to secure the middle door glass panel with a predetermined spacing from the inner glass panel to provide an air gap that ensures sufficient thermal insulation between the inner glass panel and the middle glass panel. The middle glass mounting system can be configured to prevent the middle glass panel, the insulation, and the hinge assemblies from shifting or moving relative to each other and relative to the door skin. The middle glass mounting system can be configured to minimize a thermal mass in the retention system in order to assist with reducing external door surface temperatures. The middle glass mounting system can reflect heat at the top of the door away from the top of the door and back towards the oven cavity. The middle glass mounting system also can secure the insulation-hiding flexible frame for supporting the inner glass panel and provide additional means for blocking the insulation from view from above or below the door.

FIG. 12 shows the middle glass panel 250 supported by a middle glass mounting system. The middle glass panel 250 can include, for example, soda lime glass with a tin oxide coating or the like. The middle glass mounting system can include the lower retainer 252 (shown in detail in FIG. 13), which can secure the middle glass in two dimensions. As explained, the lower retainer 252 can prevent a lower end of the middle glass panel 250 from drifting downward out of place and from moving in a rearward direction away from the door skin. The top reflector 270 extends across a top portion of the door and can prevent an upper end of the middle glass panel 250 from drifting out of place and moving in a rearward direction away from the door skin.

With reference to FIG. 14, the door assembly is illustrated without the middle glass panel 250 such that the components of the middle glass mounting system are visible. The middle glass mounting system further can include left-hand and right-hand brackets 280 that support the middle glass panel 250 from a front side of the door. The left-hand and right-hand brackets 280 can secure the middle glass panel 250 in two dimensions, such as in a side-to-side direction and in the upward direction. As explained, the left-hand and right-hand brackets 280 can cooperate with the lower retainer 252 and the upper reflector 270. The left-hand and right-hand brackets 280 can be secured in position and spacing with respect to each other at a lower end by the lower retainer 252, which may be coupled (for example, at 527) to a lower end of each of the brackets 280, and at a top end by a top reflector 270, which may be coupled (for example at 275) to each of the brackets 280.

With reference to FIGS. 15A-15D, an exemplary embodiment of left-hand and right-hand brackets 280 will now be described. The left-hand and right-hand brackets 280 can be mirror images of each other and extend along each side of the middle glass panel. The bracket 280 can include a base portion formed, for example, by a Z-shaped portion 550a, 550b, 550c, and 550d. A base portion 550a of the Z-shaped portion can include a plurality of openings 553 for engaging, for example, a plurality of threaded studs or the like for coupling the base portion to the door assembly, such as to the door skin (202a in FIG. 14). The Z-shaped portion 550a, 550b, 550c, and 550d can be configured to cooperate with corresponding Z-shaped mounting brackets of the outer glass panel, which will be described with reference to FIG. 18.

Figure 15A:
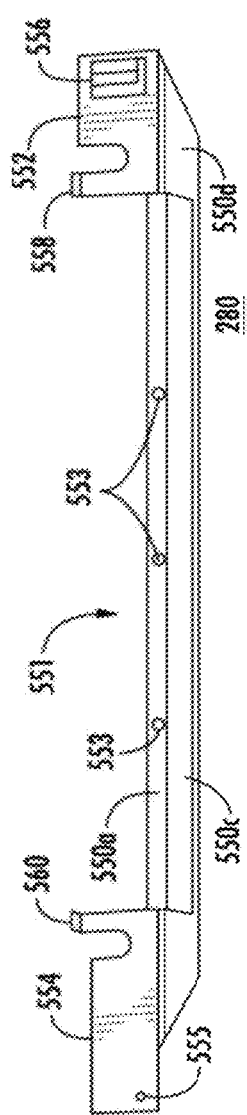
Figure 15B:
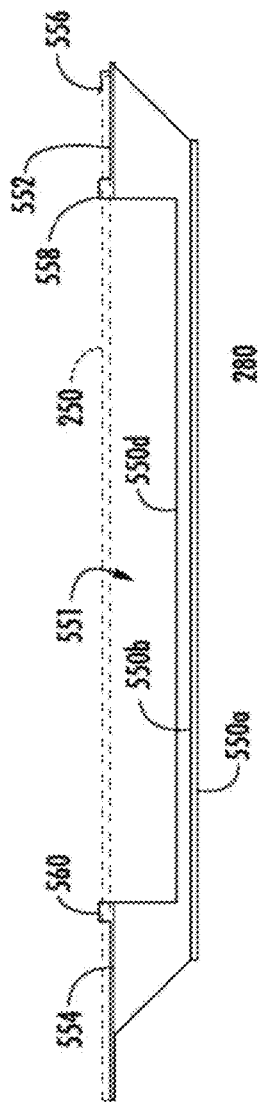
Figure 15C:
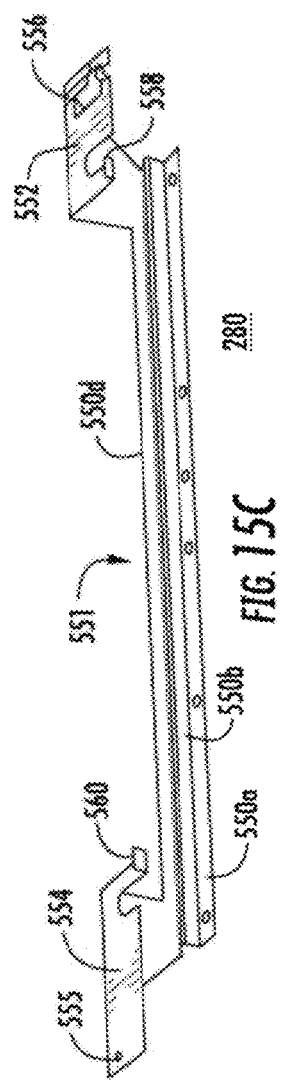

With reference again to FIGS. 15A-15D, the bracket 280 can include support surfaces 552 and 554 that support the middle glass panel 250 (shown by dashed lines in FIG. 15B) from a front side of the door. The bracket 280 can include a clip, tab, or projection 556 or the like at an upper end and that engages an end of the middle glass panel 250 which keep the glass from moving rearward towards the inner glass panel and upwards toward a top of the door. The bracket 280 can include one or more "fingers" or tabs/projections 558, 560 disposed on a side of the bracket 280 for controlling side-to-side movement of the middle glass panel 250. As shown in FIG. 15A, the left-hand bracket 280 has the tabs 558, 560 on the left-hand side to engage a left-hand edge of the middle glass panel 250. As shown in FIG. 15C, the right-hand bracket 280 has the tabs 558, 560 on the right-hand side to engage a right-hand edge of the middle glass panel 250. In this manner, the left-hand and right-hand brackets 280 can cooperate to secure the middle glass panel 250 from moving in a side-to-side direction. The bracket 280 can include a cutout 551 or the like, such as perforations, slots, notches, etc., that reduce or minimize a thermal mass of the bracket 280, thereby reducing or minimizing an effect of the bracket 280 acting as a heat sink and helping to reduce external door surface temperatures. The brackets 280 can be formed from light-weight materials to minimize or reduce the sprung weight of door. The light-weight materials, which also may have a reflective or semi-reflective surface, also may reduce heat absorption, thereby further minimizing or reducing external door skin surface temperatures.

As explained above, the left-hand and right-hand brackets 280 can cooperate with the lower retainer 252 and the upper reflector 270 to increase the stiffness of the door assembly. More particularly, the left-hand and right-hand brackets 280 can be secured in position and spacing with respect to each other at a lower end by the lower retainer 252, which may be coupled (for example, at 527) to an opening 555 of each of the brackets 280, and at a top end by a top reflector 270, which may be coupled (for example at 275) to each of the brackets 280 by the wing/tab 556.

With reference to FIGS. 16-22B, an exemplary embodiment of an outer glass mounting system will now be described. The mounting system for the outer glass panel can secure the cosmetic outer glass panel tightly against the stainless steel door skin such that no gaps are visible between the outer glass panel and the door skin at a top, bottom, left, or right of the glass panel 298. The mounting system for the outer glass panel can ensure laminar air flow through the door from bottom to top to ensure proper cooling of the door components during high temperature baking or self-cleaning cycles. The mounting system for the outer glass panel can be configured to minimize or eliminate any visible marks or fasteners on the exterior of the door skin. The outer glass panel can be formed, for example, from soda lime glass with low iron content.

With reference to FIG. 16, an exemplary embodiment of the oven door can include one or more air guides or ramps, such as an upper air guide or ramp 260 and a lower air guide or ramp 262, which may promote laminar air flow between the middle glass panel (250, not shown in FIG. 16) and the outer glass panel 298. The upper air guide 260 and lower air guide 262 can be disposed between the brackets 280, as shown in FIG. 16, and may cooperate with the fastening means of the outer glass panel 298.

FIGS. 17A and 17B illustrate exemplary embodiments of an upper air guide or ramp 260 and a lower air guide or ramp 262, respectively. With reference to FIG. 17A, the upper air guide or ramp 260 can include a planar airflow surface 570 that is positioned at an angle with respect to the outer glass panel and the middle glass panel when the ramp 260 is installed by a riser portion 572. The ramp 260 can include another angled portion or lip 574 for guiding or deflecting heated air flowing upward from the surface of the outer glass panel to the planar airflow surface 570. The ramp 260 can include a plurality of openings 575 for engaging, for example, the fastening means of the outer glass panel 298, such as one or more threaded studs (described with reference to FIG. 19C).

With reference to FIG. 17B, the lower air guide or ramp 262 can include a planar airflow surface 580 that is positioned at an angle with respect to the outer glass panel and the middle glass panel when the ramp 262 is installed by a riser portion 582. The ramp 262 can include a plurality of openings 583 for engaging, for example, the fastening means of the outer glass panel 298, such as one or more threaded studs (described with reference to FIG. 19C). The upper air guide 260 and the lower air guide 262 can ensure laminar air flow through the door from bottom to top to ensure proper cooling of the door components during high temperature baking or self-cleaning cycles. In this way, the outer glass panel mounting system can minimize or eliminate turbulent air flow through door.

With reference again to FIG. 18, the outer glass panel 298 can be secured to the door skin by brackets. FIG. 18 shows upper and lower brackets 282. The outer glass mounting system also can include left-hand and right-hand side brackets (Z-brackets), which are not visible in FIG. 18. With reference to FIGS. 19A-19C, the brackets 282 may be Z-brackets including with designed-in interference to press the outer glass panel 298 firmly against the door skin by holding the panel 298 at the edges, for example, in a manner similar to a "rabbet" on a back of a picture frame. The bracket 282 can include a Z-shaped cross-section formed by portions 590, 592, 594, and 596. The portion 590 can be a base portion having a plurality of openings 591 for engaging one or more fasteners, such as threaded studs 604 in FIG. 19C (and described with reference to FIGS. 22A and 22B) to secure the bracket 282 to the door skin.

As shown in FIG. 19C, the openings 575 in the air ramp 260 can be configured to align with the openings 591 of the bracket 282 such that the bracket 282 and the air ramp 260 engage the same threaded studs 604. A nut (not shown in FIG. 19C) can be threaded onto the stud 604 to secure the ramp 260 and the bracket 282 in place and providing a tight, gap-free fit of outer glass panel 298 to door skin.

With reference to FIGS. 20-22B, a plurality of strips 284 (e.g., metal pin strips) can be coupled to the door skin 202a for coupling the brackets (282 in FIGS. 18-19C) to the door skin 202a without marking an exterior side of the door skin 202a. FIG. 20 shows the outer glass panel 298 in place, and FIG. 21 shows the door skin 202a without the outer glass panel 298. With reference to FIGS. 22A and 22B, an exemplary strip 284 can include a plate portion 602 having a plurality of studs 604, such as threaded studs for receiving a nut in threaded engagement. In other embodiments, the studs 604 can include other fastening means, such as an internal bore for receiving a screw or bolt, a notch or groove for receiving a retainer clip or o-ring, etc.

As shown in FIG. 22B, an exemplary embodiment of the strip 284 can be formed by inserting a plurality of threaded studs 604 having heads 606 through openings formed in the plate portion 602. The studs 604 can be coupled to the plate portion 602 by means, such as welding, or formed by stamping a shape into the plate portion 602.

With reference again to FIGS. 19C and 20, in operation, the cosmetic glass outer panel 298 ("skin" or "outer" glass) can be placed centered inside the door skin 202a at a correct position. The strips 284 having the threaded studs 604 can be secured to the inside of the door skin 202a, around a perimeter of the outer glass panel 298 using, for example, adhesive tape. In other embodiments, the strips 284 can be secured to the door skin 202a using other coupling means, such as adhesive paste, welding, soldering, etc. If an adhesive is used, then the door can be configured such that a temperature at the door skin where the tape is attached to the door skin 202a does not exceed an allowable temperatures for the adhesive. In this way, the strips 284 can be coupled to the interior surface of the door skin 202a without penetrating or marking an exterior of the door skin 202a, thereby maintaining a desired cosmetic appearance of the door skin 202a.

According to the exemplary embodiments, the outer glass panel mounting system can minimize or eliminate turbulent air flow through door and cosmetic blemishes on the exterior of the door skin, while providing a tight, gap-free fit of outer glass panel to door skin that remains securely attached to the door skin through a full operating temperature range of the appliance, including a self-cleaning process. The outer glass panel mounting system also can provide the ability to remove the outer glass panel for service without breaking/reapplying adhesive.

As explained, the full transparent ceramic inner panel 220 extends across the width and height of the inner surface of the door, and therefore, the door does not include a porcelain liner or plunger having cutouts for the oven latch to engage in order to lock the range door during a self-cleaning process. With reference to FIGS. 23A-24B, an exemplary embodiment of a latch system, which can be coupled to a door having a full glass inner panel, will now be described.

As shown in FIG. 23A, a latch retainer 620 can include a body/plate portion 622 having an opening 623 for receiving and engaging a corresponding a oven lock (not shown in FIG. 23A). The latch retainer 620 can include a mounting portion for coupling the latch retainer 620 to an inner surface of the door skin. In this example, the latch retainer 620 can include a plurality of flanges for stabilizing the latch retainer 620 against the door skin surface (202c in FIG. 23B) and coupling the latch retainer 620 to the door skin surface (202c in FIG. 23B). For example, the latch retainer 620 can include one or more flanges 624 projecting substantially perpendicularly from one or both sides of the plate portion 622, each flange 624 having an opening 625 for fastening the latch retainer 620 to a part of the door skin surface (202c in FIG. 23B) such that the latch retainer 620 projects substantially perpendicularly from the door skin surface (202c in FIG. 23B). In other embodiments, the latch retainer 620 can be configured to project at an angle from the door skin surface (202c in FIG. 23B). The latch retainer 620 can include a flange 626 projecting substantially perpendicularly from one or both sides of the plate portion 622 for stabilizing the latch retainer 620 against the door skin surface (202c in FIG. 23B). In other embodiments, the flange 626 can be configured to position the latch retainer 620 at an angle from the door skin surface (202c in FIG. 23B). The flanges 624 and flange 626 can be disposed in a same plane and on opposite sides of the plate portion 622.

With reference to FIGS. 23B-24B, the latch retainer 620 can be coupled to an inner surface of the door skin surface (e.g., top surface 202c) using fasteners, such as threaded screws 628. The top surface 202c can include one or more mounting surfaces 630 (shown in FIGS. 23B and 23C) formed between the slots 203 to provide a stable location for mounting the latch retainer 620. As shown in FIG. 24B, the door skin can include a latch cover 216 projecting downward from the upper surface 202c of the door and disposed in a plane of the inner glass panel 220 (e.g. corresponding to the latch opening 228 of the inner glass panel 220 in FIG. 7). The latch cover 216 can include a lock guide opening 219 for receiving and guiding a door lock to the opening 623 of the latch retainer 620, which may be disposed in an interior of the door and adjacent to the latch cover 216. The latch cover 216 can be integrally formed with the door skin or a separate element attached to the door skin. The latch retainer 620 can be coupled to an inner surface of the door skin (e.g., top surface 202c) using fasteners, such as threaded screws 628 or the like. As shown in FIGS. 24A and 24B, the guide opening 219 of the latch cover 216 can receive and guide a latch/lock 702 of a lock assembly 700 to the opening 623 of the latch retainer 620. The latch 702 then can engage the latch retainer 620 through the opening 623 to secure the door in a locked position, for example, for performing a self-cleaning process.

The exemplary latch retainer 620 can provide means for locking a door having a full glass inner panel and for maintaining a spacing between the door latch 702 and the door skin while also providing a sufficient amount of strength needed to securely latch/lock the door in a closed position for a self-cleaning cycle. In this way, the exemplary embodiments can provide a latch system for a door without a conventional plunger or frame and instead having an inner surface formed by a non-structural full glass inner panel. The exemplary latch system can be formed easily and with minimal expense and can also be easily repaired or replaced.

Figure 25B:
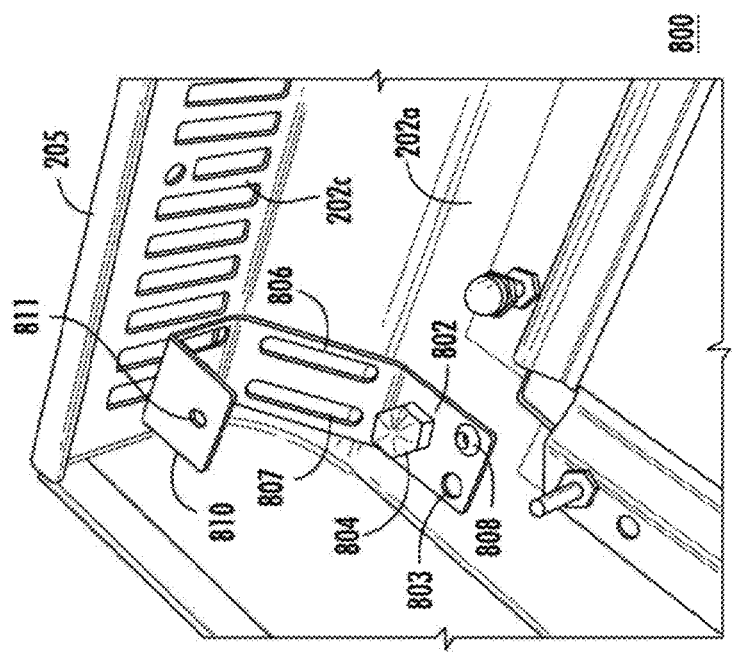
FIG. 25B is a partial perspective view of a door having a hinge retainer assembly according to another exemplary embodiment of the invention.
Figure 25A:
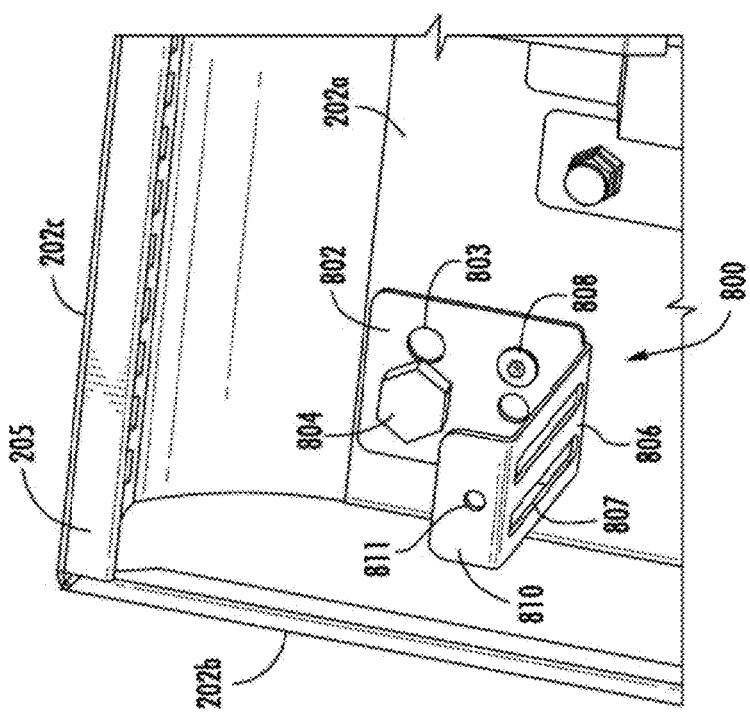
FIG. 25A is partial perspective view of a door having a hinge retainer assembly according to an exemplary embodiment of the invention.

As explained, the full transparent ceramic inner panel 220 extends across the width and height of the inner surface of the door, and therefore, the door does not include a porcelain liner or plunger, which conventionally may be used to mount the door hinge assemblies. With reference to FIGS. 25A-25C, an exemplary embodiment of a hinge retainer system, which can be used to couple a hinge assembly to a door skin of a door having a full glass inner panel, will now be described.

A lower end of a hinge assembly (240 in FIG. 8) can be coupled to the bottom end of the door skin (as shown in FIG. 6D). With reference to FIGS. 25A-25C, an upper end of a hinge assembly (240 in FIG. 25C) can be coupled to the door skin 202a with a hinge retainer 800. As shown in FIGS. 25A and 25B, exemplary embodiments of a hinge retainer 800 can include a body/plate portion 802 having one or more openings 803 for receiving and engaging one or more fasteners (e.g., 804, 808). The hinge retainer 800 can include a side wall 806 extending from the plate portion 802. The side wall 806 can extend perpendicular to the plate portion 802, as shown in FIG. 25A, or at an angle to the plate portion 802, as shown in FIG. 25B. The hinge retainer 800 can include a mounting flange 810 having, for example, an opening 811 for receiving a fastener (not shown in FIGS. 25A and 25B; 812 in FIG. 25C) to couple an upper end of a hinge assembly (240 in FIG. 25C) to the hinge retainer 800. The side wall 806 can include one or more cutouts, slots, or perforations 807 for minimizing a thermal mass of the hinge retainer 800 in order to assist with reducing external door surface temperatures. As shown in FIGS. 25A and 25B, the hinge retainer 800 can be coupled to the door skin 202a in a corner region of the door, for example, adjacent to the side surface 202b and the top surface 202c, which includes the lip 205.

FIG. 25C shows a partial cutaway view of an upper region of the door showing an exemplary arrangement of the door handle 206, door skin 202a, and top surface 202c. The lip 205 and the latch cover 216 of the top surface 202c are visible in FIG. 25C, along with the latch retainer 620 and the fastener (threaded screw 628) coupling the latch retainer 620 to the top surface 202c. FIG. 25C also shows the arrangement of an upper end of each of the metal strip 284, the bracket 280, and the hinge assembly 240. The upper air guide 260 also is visible in FIG. 25C.

As shown in FIG. 25C, the hinge retainer 800 can couple an upper end of the hinge assembly 240 to the door skin 202a in a corner region of the door, for example, adjacent to the top surface 202c. The fastener 804 can be configured to engage an opening (803 in FIGS. 25A and 25B) in the body/plate portion 802 of the hinge retainer 800 and extend through a corresponding opening in the door skin 202a that is disposed adjacent to the door handle 206 such that the fastener 804 couples the body/plate portion 802 of the hinge retainer 800 and the handle 206 to the door skin 202a. The fastener 804 can be concealed from view by the door handle 206 when installed. The fastener 808 also can be configured to engage another opening (803 in FIGS. 25A and 25B) in the body/plate portion 802 of the hinge retainer 800 and extend through a corresponding opening in the door skin 202a that is concealed from view by the door handle 206 when installed. The side wall 806 extends from the body/plate portion 802, on one end, to the mounting flange 810, on the other end. The mounting flange 810 can be coupled to the upper portion of the hinge assembly 240 by one or more fasteners 812. According to the exemplary embodiments illustrated in FIGS. 25A-25C, the hinge retainer 800 can be used to couple the upper end of the hinge assembly 240 to the door skin 202a of a door having a full glass inner panel (i.e., without a "plunger") without any markings, fasteners, etc. being visible from an outside of the door.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A household cooking appliance comprising:
 a housing having an oven chamber accessible through an opening, the opening having a seal surrounding a perimeter of the opening;
 a door covering the opening and moveable about a hinge between an open position and a closed position, the door including a door skin forming an outer front surface of the door and an outer side surface of the door, and a full glass inner panel forming an inner surface of the door, the full glass inner panel abutting the seal when the door is in a closed position;
 an oven lock having a latch movable between an unlocked position and a locked position that locks the door in the closed position during a self-cleaning process; and
 a latch retainer coupled to the door skin, the latch retainer including a body portion having an opening that receives and engages the latch of the oven lock in the locked position such that the door is locked in the closed position, wherein the body portion and the opening of the body portion are disposed within an interior space of the door surrounded by the door skin and the full glass inner panel, and within a perimeter of the door defined by the outer side surface of the door skin.

2. The household cooking appliance of claim 1, wherein the latch retainer further comprises:
 a mounting portion coupling the body portion of the latch retainer to an inner surface of the door skin.

3. The household cooking appliance of claim 1, wherein the latch retainer further comprises:
 a plurality of flanges on the body portion, the plurality of flanges stabilizing the latch retainer against an inner surface of the door skin and coupling the latch retainer to the inner surface of the door skin.

4. The household cooking appliance of claim 3, wherein the plurality of flanges includes a flange projecting substantially perpendicularly from one or both sides of the body portion, the flange having an opening for fastening the latch retainer to the inner surface of the door skin such that the latch retainer projects substantially perpendicularly from the inner surface of the door skin.

5. The household cooking appliance of claim 3, wherein the plurality of flanges includes a flange projecting substantially perpendicularly from a side of the body portion, the flange having an opening for fastening the latch retainer to the inner surface of the door skin such that the latch retainer projects substantially perpendicularly from the inner surface of the door skin.

6. The household cooking appliance of claim 3, wherein the inner surface of the door skin includes an inner surface of a top side of the outer side surface of the door.

7. The household cooking appliance of claim 6, wherein the inner surface of the top side includes a plurality of vents, and
wherein the top side includes a latch mounting surface disposed between a pair of the plurality of vents.

8. The household cooking appliance of claim 1, wherein the latch retainer is coupled to an inner surface of a top side of the outer side surface of the door skin.

9. The household cooking appliance of claim 8, wherein the door skin includes a latch cover projecting downward from an upper surface of the top side of the outer side surface of the door skin, the latch cover projecting downward in a same plane with the inner surface of the door formed by the full glass inner panel.

10. The household cooking appliance of claim 9,
wherein the latch cover includes a lock guide opening that receives and guides the latch of the oven lock into the interior space of the door and to the opening of the body portion of the latch retainer.

11. The household cooking appliance of claim 9, wherein the latch cover is integrally formed with the door skin.

12. The household cooking appliance of claim 1, wherein the full glass inner panel which forms the inner surface of the door includes a first portion and a second portion, the first portion being adjacent to a first area within the perimeter of the seal surrounding the opening and directly exposed to heating of the oven chamber, and the second portion being adjacent to a second area outside of the perimeter of the seal and being insulated from the heating of the oven chamber by the seal.

13. The household cooking appliance of claim 12, wherein the full glass inner panel extends substantially from edge-to-edge of the perimeter of the door.

14. The household cooking appliance of claim 13, wherein the full glass inner panel extends substantially from top-to-bottom of the door.

15. The household cooking appliance of claim 13, wherein the full glass inner panel includes a transparent ceramic inner panel.

16. The household cooking appliance of claim 1, wherein the door further comprises:
means for movably supporting the full glass inner panel without penetrating through the inner surface of the full glass inner panel.

17. The household cooking appliance of claim 1, further comprising:
a retaining lip extending across a top edge of the door and retaining a top edge of the full glass inner panel; and
a hinge retainer disposed adjacent to the hinge of the door, the hinge retainer retaining a corner area of the full glass inner panel.

18. The household cooking appliance of claim 17, wherein a perimeter of the full glass inner panel includes a cutout corresponding to the hinge and the hinge retainer, wherein the hinge retainer engages an edge of the cutout to retain the full glass inner panel.

19. The household cooking appliance of claim 1, wherein a perimeter of the full glass inner panel includes a first cutout at a first location corresponding to the hinge of the door.

20. The household cooking appliance of claim 19, wherein the perimeter of the full glass inner panel includes a second cutout at a second location corresponding to the opening of the body portion of the latch retainer of the door to permit the latch of the oven lock to pass into the interior space of the door and engage the opening of the body portion of the latch retainer.

21. The household cooking appliance of claim 1, wherein the outer front surface of the door skin includes an outer glass panel; and
wherein the household cooking appliance further comprises a middle glass panel disposed between the outer glass panel and the full glass inner panel.

22. The household cooking appliance of claim 21, wherein the outer side surface of the door skin comprises:
a first side surface and a second side surface opposed to the first side surface, the first side surface and the second side surface extending substantially perpendicular from side edges of the outer front surface in a direction toward the full glass inner panel; and
an upper surface extending from an upper edge of the outer front surface in the direction toward the full glass inner panel,
wherein the full glass inner panel extends substantially from the first side surface to the second side surface.

23. The household cooking appliance of claim 1, wherein the full glass inner panel includes a transparent ceramic inner panel.

24. The household cooking appliance of claim 1, wherein a surface of the body portion having the opening is parallel to the outer front surface of the door skin.

25. The household cooking appliance of claim 1, wherein the body portion having the opening of the latch retainer is spaced apart from the outer front surface of the door skin.

26. The household cooking appliance of claim 1, wherein the body portion having the opening of the latch retainer is spaced apart from both the outer front surface of the door skin and from the full glass inner panel.

27. The household cooking appliance of claim 1, wherein the full glass inner panel includes a cutout at a location corresponding to the opening of the body portion of the latch retainer, the cutout configured to permit the latch of the oven lock to pass into the interior space of the door and engage the opening of the body portion of the latch retainer.

28. The household cooking appliance of claim 1, wherein the body portion and the opening of the body portion are disposed below a top side of the outer side surface of the door and lower than an uppermost edge of the full glass inner panel.

29. A household cooking appliance comprising:
a housing having an oven chamber accessible through an opening, the opening having a seal surrounding a perimeter of the opening;
a door covering the opening and moveable about a hinge between an open position and a closed position, the door including a door skin forming an outer front surface of the door and an outer side surface of the door, and a full glass inner panel forming an inner surface of the door, the full glass inner panel abutting the seal when the door is in a closed position; and
an oven lock having a latch movable between an unlocked position and a locked position that locks the door in the closed position during a self-cleaning process; and
means for receiving and engaging the latch of the oven lock in the locked position and locking the door in the closed position, wherein the means is disposed within an interior space of the door surrounded by the door skin and the full glass inner panel, and within a perimeter of the door defined by the outer side surface of the door skin.

30. A household cooking appliance comprising:

a housing having an oven chamber accessible through an opening, the opening having a seal surrounding a perimeter of the opening;

a door covering the opening and moveable about a hinge between an open position and a closed position, the door including a door skin forming an outer front surface of the door and an outer side surface of the door, and a full glass inner panel forming an inner surface of the door, the full glass inner panel abutting the seal when the door is in a closed position;

an oven lock having a latch movable between an unlocked position and a locked position that locks the door in the closed position during a self-cleaning process; and a latch retainer coupled to the door skin, the latch retainer including a body portion having an opening that receives the latch of the oven lock in the locked position such that the body physically engages a portion of the received latch to prevent withdrawing of the latch from the opening and the door is locked in the closed position, wherein the body portion and the opening of the body portion are disposed within an interior space of the door surrounded by the door skin and the full glass inner panel, and below a top side of the outer side surface of the door and lower than an uppermost edge of the full glass inner panel.

31. The household cooking appliance of claim 30, wherein a surface of the body portion having the opening of the latch retainer is parallel to the outer front surface of the door skin.

32. The household cooking appliance of claim 30, wherein the body portion which has the opening is spaced from both the outer front surface of the door skin and the full glass inner panel.

33. The household cooking appliance of claim 30, wherein the full glass inner panel includes a cutout at a location corresponding to the opening of the body portion of the latch retainer, the cutout configured to permit the latch of the oven lock to pass into the interior space of the door and engage the opening of the body portion of the latch retainer.

* * * * *